(12) United States Patent  
Singaravelu

(10) Patent No.: US 9,979,539 B2  
(45) Date of Patent: May 22, 2018

(54) METHOD AND SYSTEM OF AUTHENTICATING A NETWORK DEVICE IN A LOCATION BASED VERIFICATION FRAMEWORK

(71) Applicant: SAMSUNG ELECTRONICS CO., LTD., Suwon-si (KR)

(72) Inventor: Pradheepkumar Singaravelu, Noida (IN)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days. days.

(21) Appl. No.: 14/568,351

(22) Filed: Dec. 12, 2014

(65) Prior Publication Data

US 2015/0188918 A1 Jul. 2, 2015

(30) Foreign Application Priority Data

Dec. 30, 2013 (IN) .......................... 6149/CHE/2013

(51) Int. Cl.
*G06F 7/04* (2006.01)
*H04L 9/08* (2006.01)
(Continued)

(52) U.S. Cl.
CPC .......... *H04L 9/0866* (2013.01); *H04L 9/0872* (2013.01); *H04L 9/32* (2013.01);
(Continued)

(58) Field of Classification Search
CPC ............... H04L 63/08; H04L 2209/805; H04L 67/1002; H04L 67/1095; H04L 67/1097; H04L 67/145; H04L 9/0866; H04L 9/0872; H04L 9/32; H04W 12/06; H04W 12/08; H04W 12/10; H04W 4/008; H04W 4/02; G06F 21/36; G06F 21/6218; G06F 2221/2103; G06F 21/60; G06F 21/602; G06F 21/604; G06F 2221/2107; G06F 21/305; G06F 21/32; G06F 21/34;
(Continued)

(56) References Cited

U.S. PATENT DOCUMENTS 6,975,618 B1 * 12/2005 Smith ................... H04W 64/00
370/324
7,640,329 B2 12/2009 Rao et al.
(Continued)

FOREIGN PATENT DOCUMENTS

EP 2 153 583 12/2008
EP 2 232 733 6/2009
(Continued)

*Primary Examiner* — Abiy Getachew
(74) *Attorney, Agent, or Firm* — Sughrue Mion, PLLC

(57) ABSTRACT

A method and system of authenticating a network device includes providing identification information of a first network device to a second network device and a third network device. The identification information includes location information of the first network device and a timestamp. The method includes verifying the location information of the first network device by a hyperbolic verification scheme. The verification is performed by the second network device and the third network device. The method includes authenticating the first network device based on the verification.

14 Claims, 26 Drawing Sheets

(51) Int. Cl.
*H04W 4/00* (2018.01)
*H04W 12/06* (2009.01)
*H04L 9/32* (2006.01)

(52) U.S. Cl.
CPC .......... *H04W 4/008* (2013.01); *H04W 12/06* (2013.01); *H04L 2209/805* (2013.01)

(58) Field of Classification Search
CPC .......... G06F 21/74; G06F 21/78; G06F 21/85; G06F 2221/2147; G06F 1/1684; G06F 1/1694; G06F 2200/1636; G06F 3/0433; G06F 3/04883; G06F 3/167; G10L 2015/226; G04G 21/025; G04G 21/04; G04G 21/06; G06K 19/07762; G06K 7/10297; G06K 7/10366; G06K 7/10425; G06Q 10/02; G06Q 10/08; G06Q 10/083; G06Q 10/0832
USPC .......................................................... 726/7
See application file for complete search history.

(56) References Cited

U.S. PATENT DOCUMENTS

| | | |
|---|---|---|
| 7,882,356 B2 | 2/2011 | Klemets et al. |
| 8,224,939 B2 | 7/2012 | Hyvarinen et al. |
| 8,473,600 B2 | 6/2013 | Hyvarinen et al. |
| 2003/0217137 A1* | 11/2003 | Roese ................ G01S 5/02 709/223 |
| 2005/0283618 A1* | 12/2005 | Min .................. H04L 63/083 713/182 |
| 2008/0095374 A1 | 4/2008 | Schreyer |
| 2013/0222230 A1* | 8/2013 | Choi ................ G06F 3/167 345/156 |
| 2013/0268357 A1* | 10/2013 | Heath ................ H04L 63/00 705/14.53 |
| 2014/0003597 A1* | 1/2014 | Lazaridis ........... H04M 3/543 379/212.01 |
| 2014/0133656 A1* | 5/2014 | Wurster ............. H04L 9/0637 380/270 |
| 2014/0164761 A1* | 6/2014 | Kufluk .............. H04L 63/10 713/155 |

FOREIGN PATENT DOCUMENTS

| | | |
|---|---|---|
| EP | 2 239 881 A2 | 10/2010 |
| KR | 10-2006-0092864 A | 8/2006 |
| KR | 10-2007-0042001 A | 4/2007 |
| KR | 10-2007-0045250 A | 5/2007 |
| KR | 10-2009-0060924 A | 6/2009 |
| KR | 10-2009-0084632 A | 8/2009 |
| WO | 2008/147021 A1 | 12/2008 |
| WO | 2009/075499 A2 | 6/2009 |

* cited by examiner

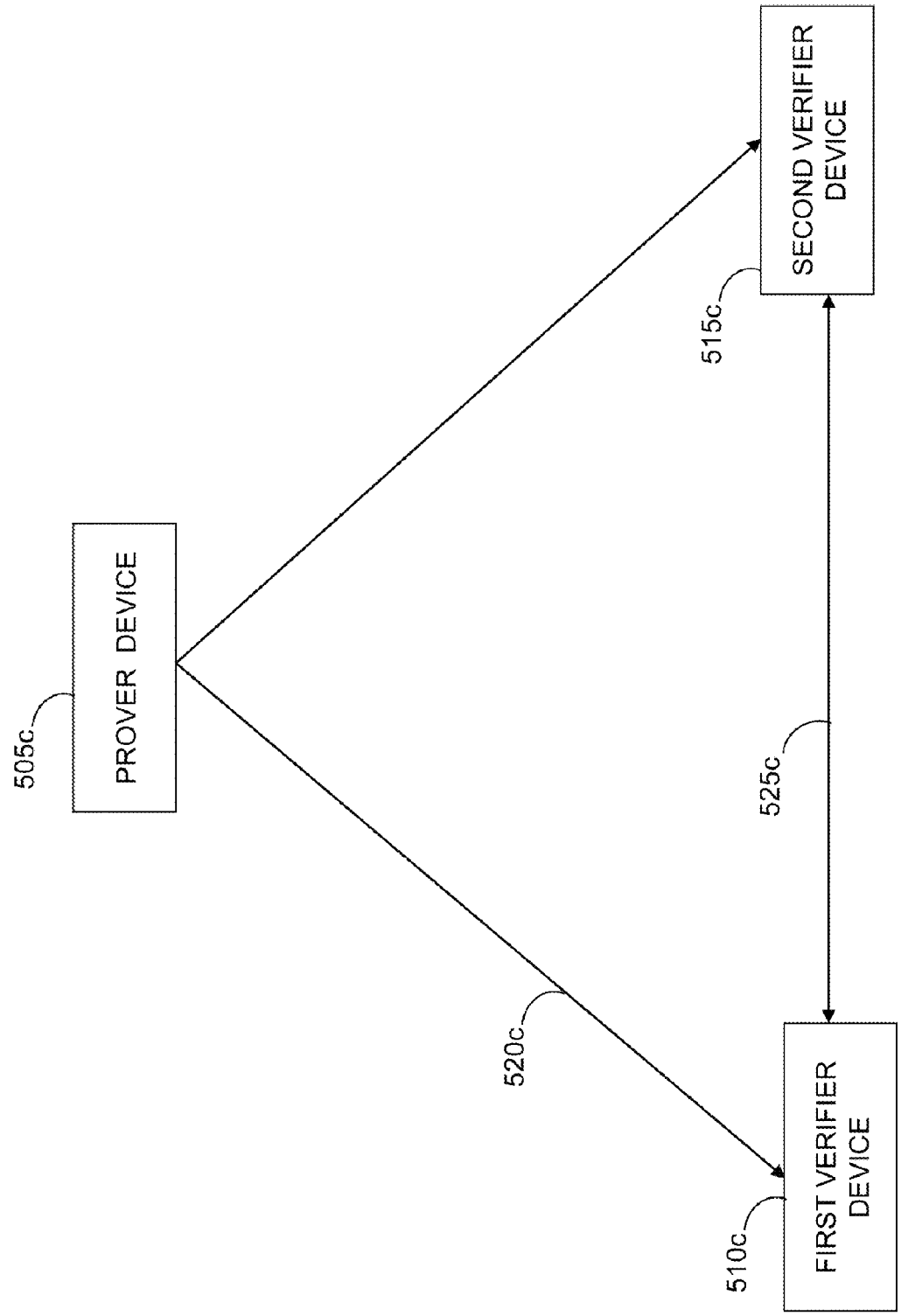

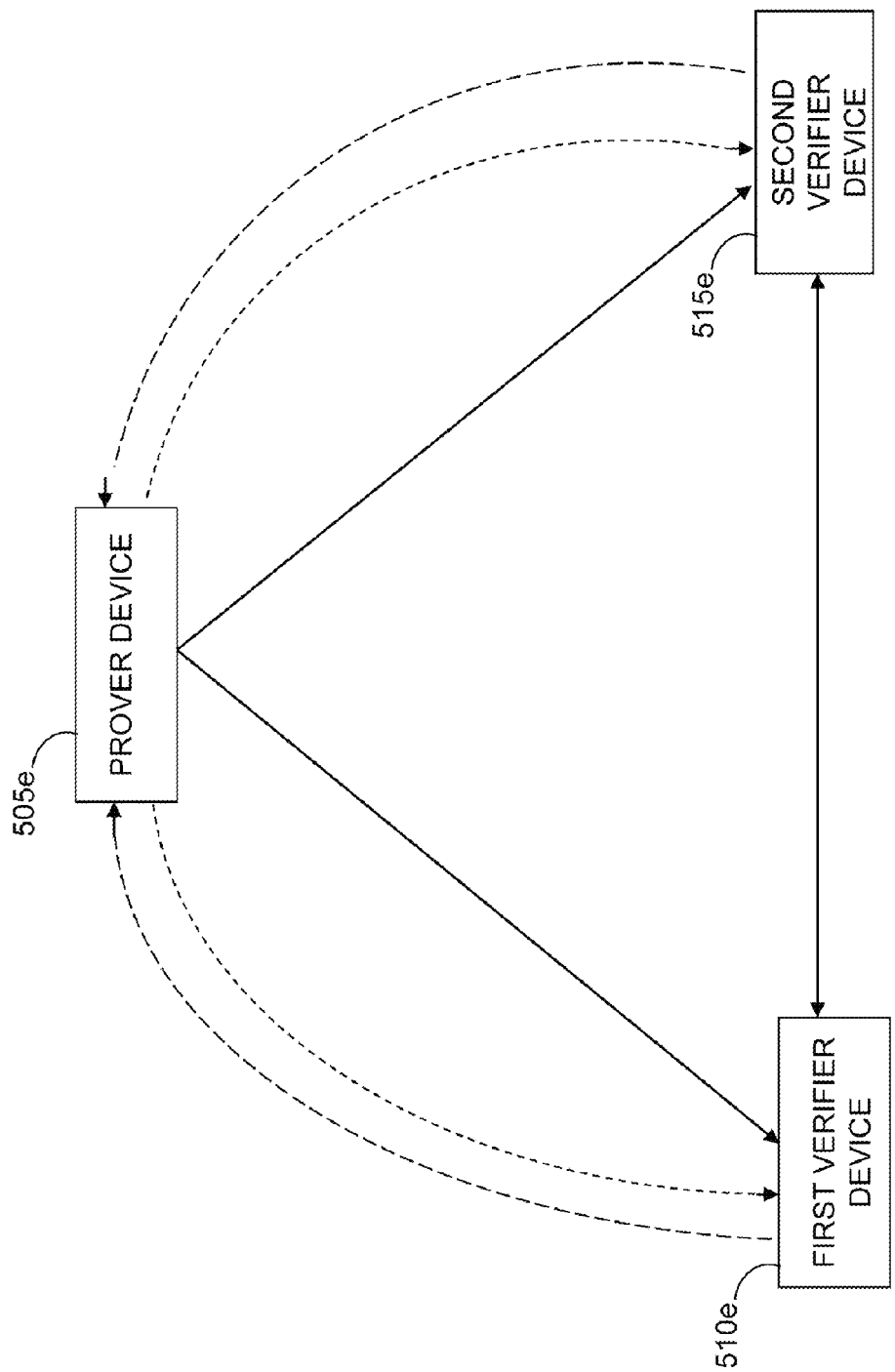

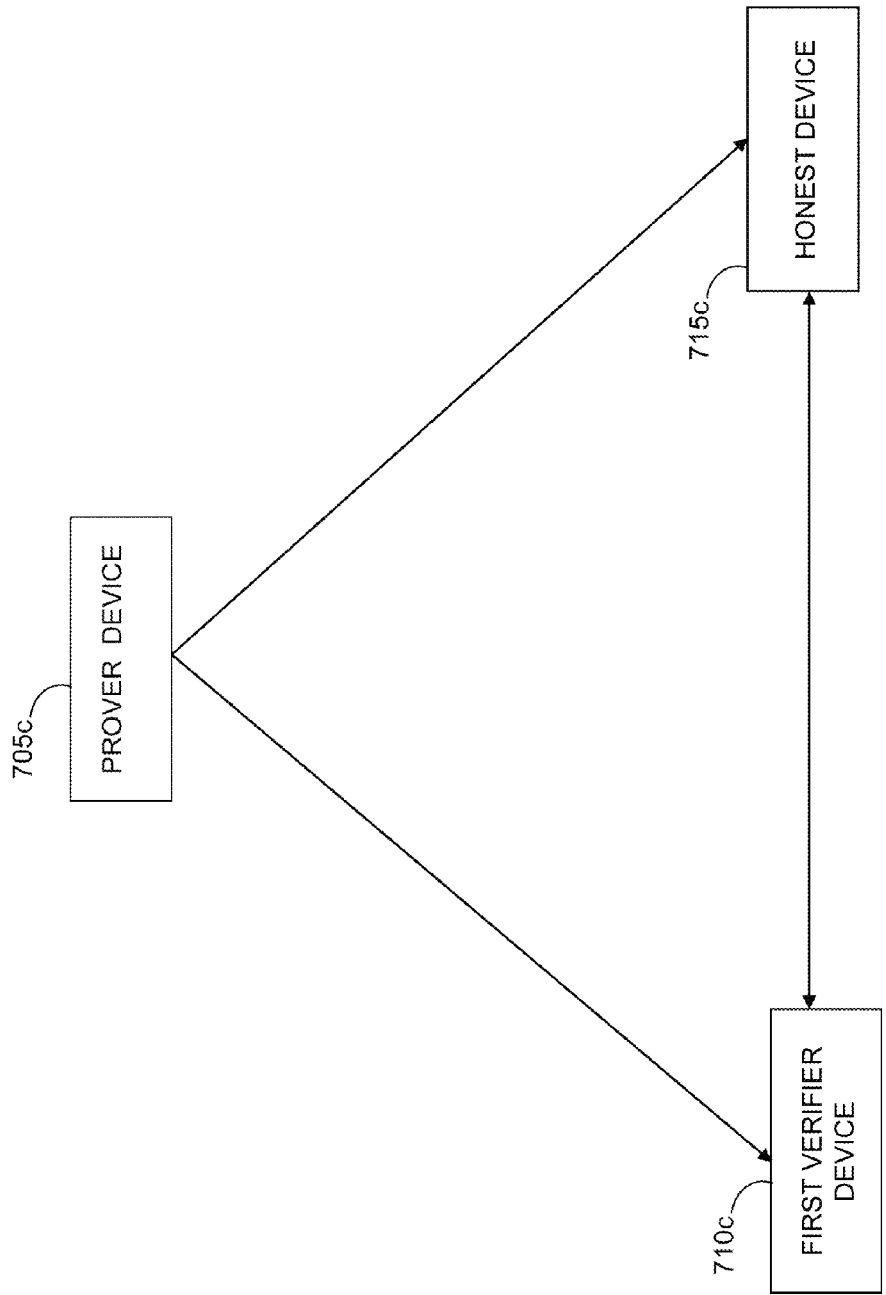

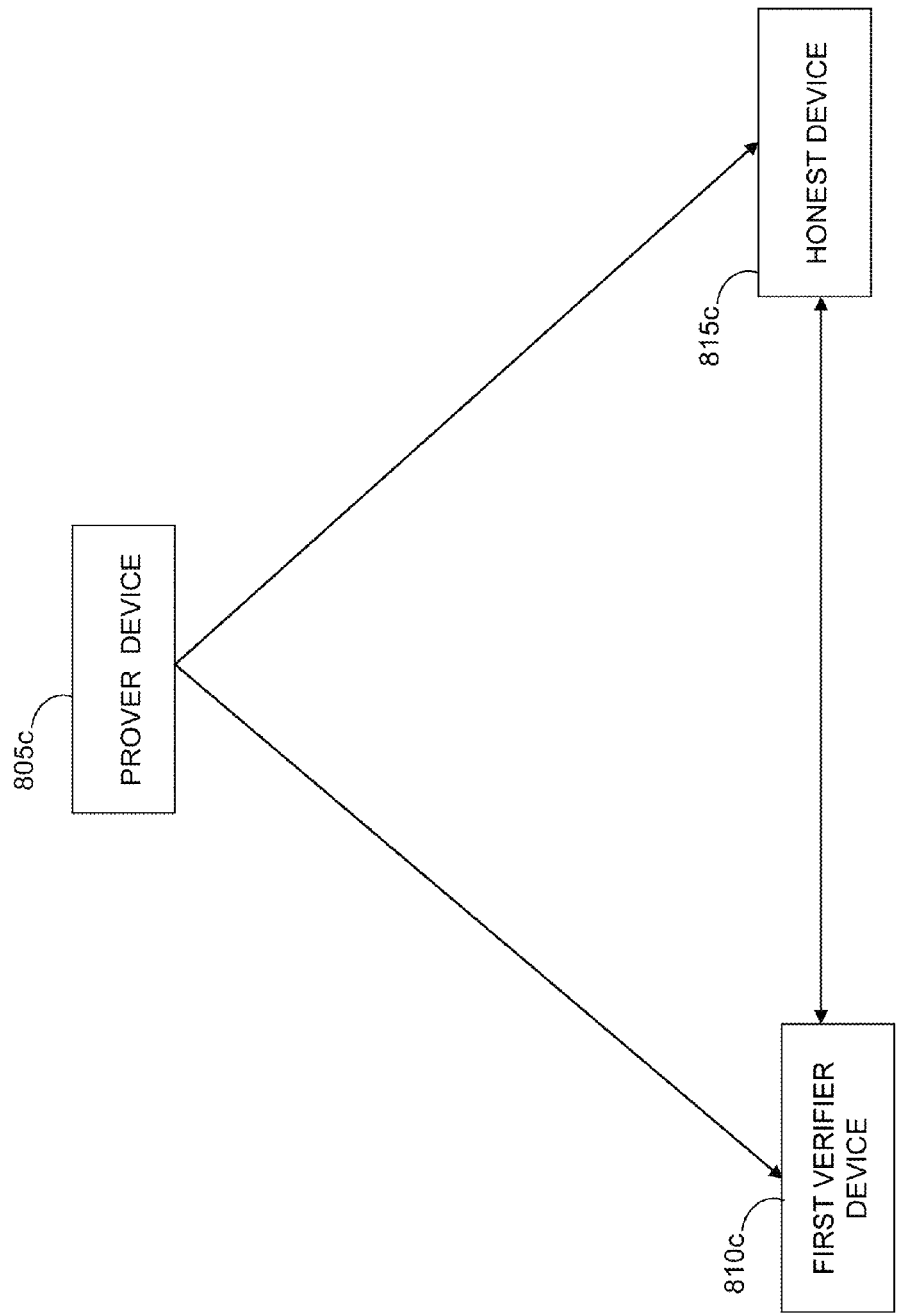

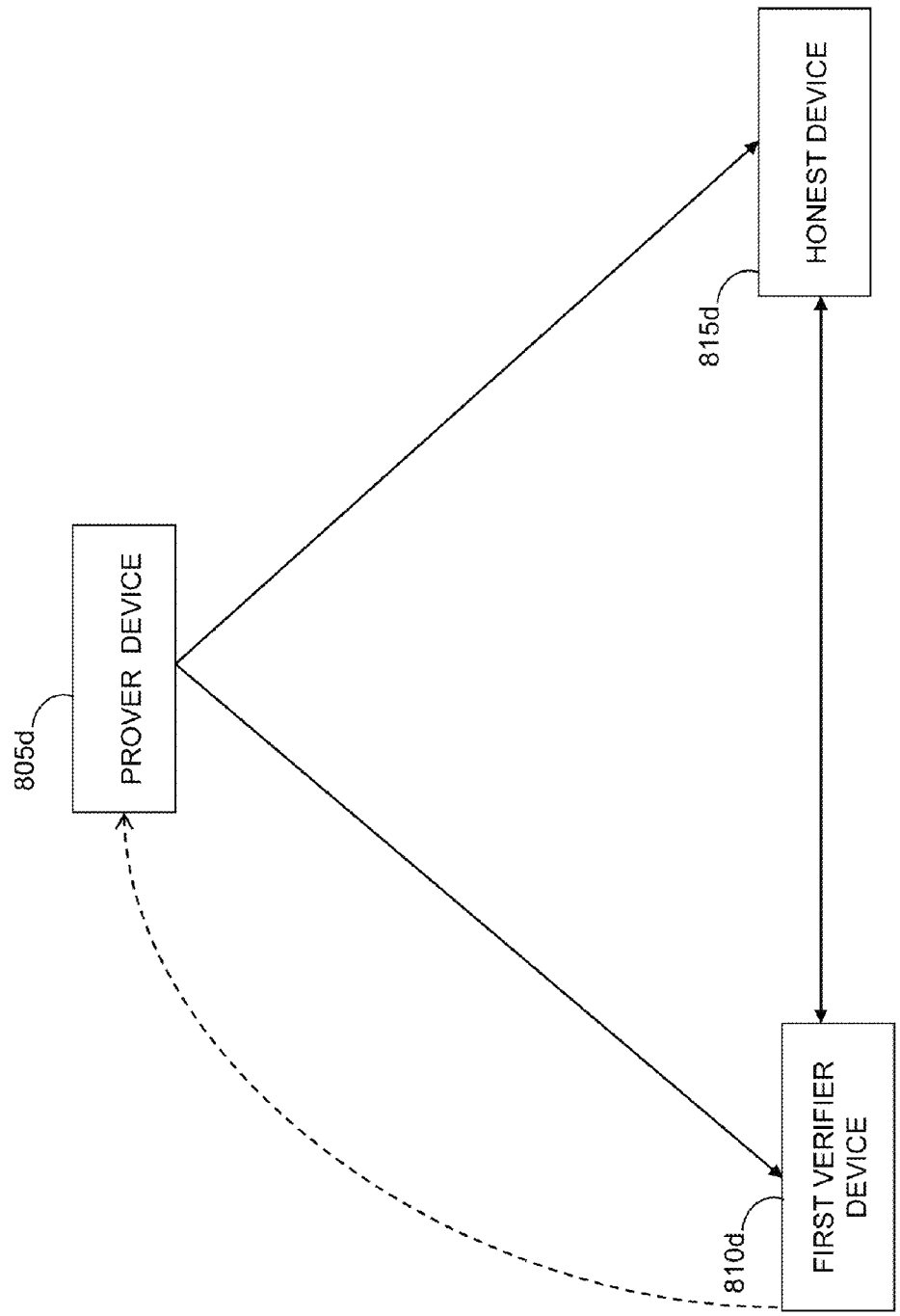

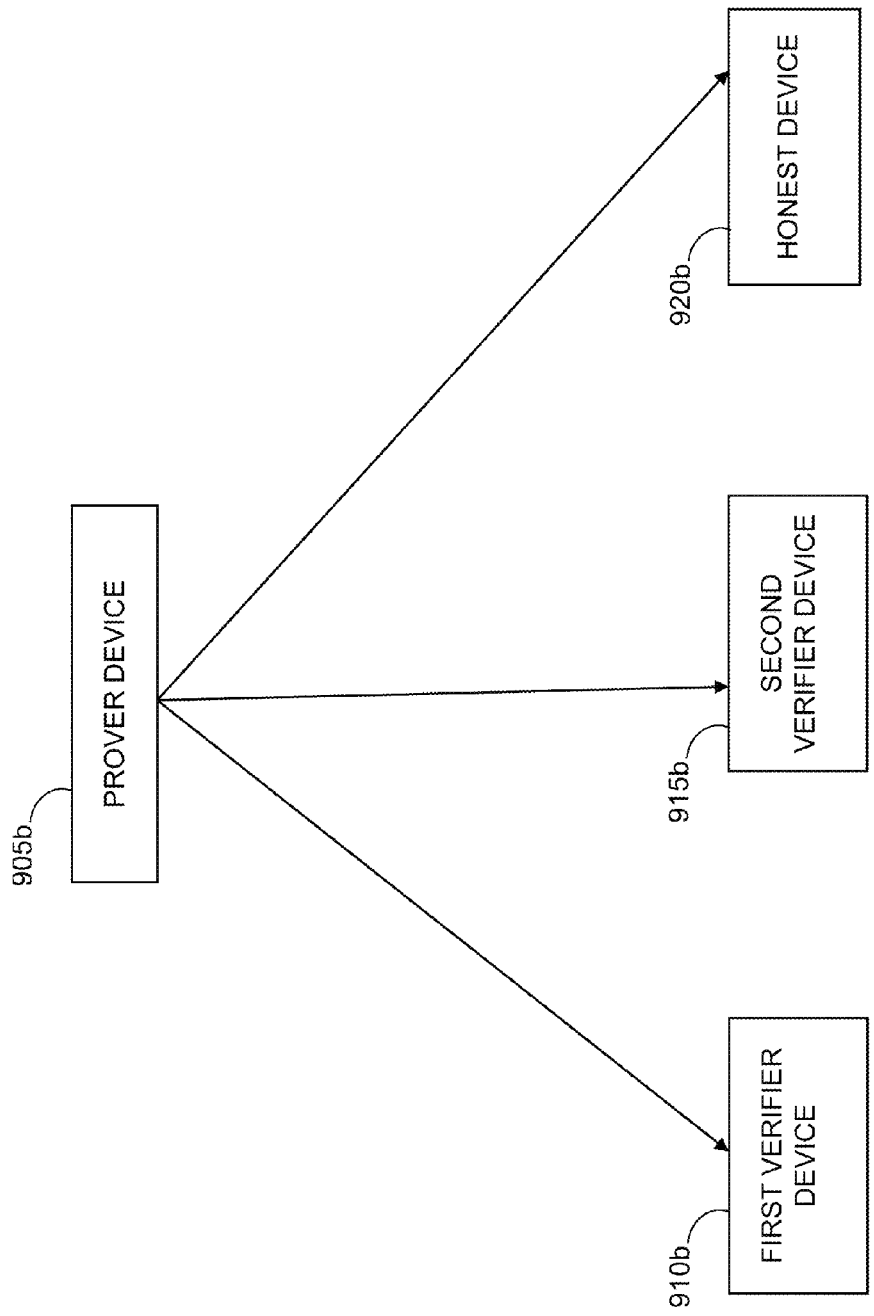

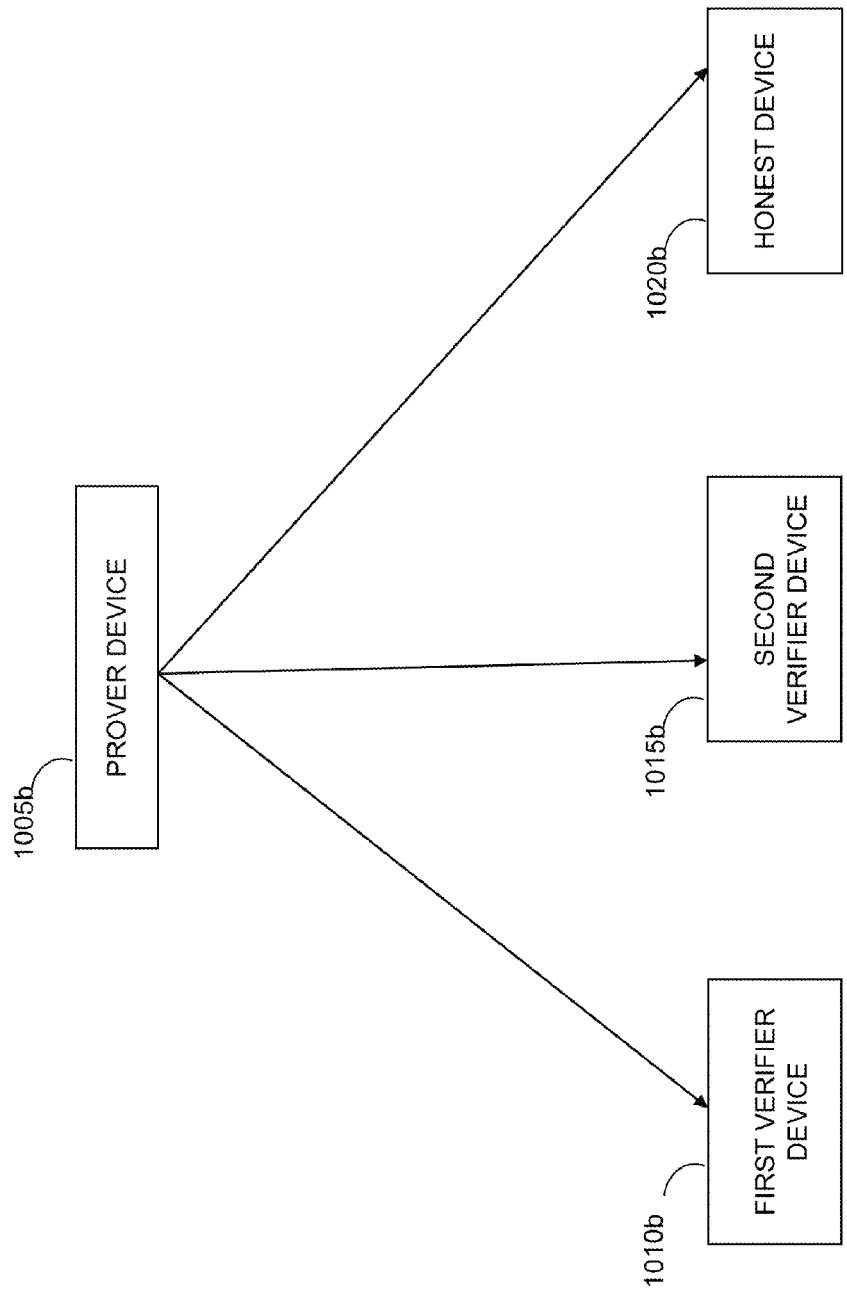

METHOD AND SYSTEM OF AUTHENTICATING A NETWORK DEVICE IN A LOCATION BASED VERIFICATION FRAMEWORK

CROSS-REFERENCE TO RELATED APPLICATION

This application claims priority from India Patent Application No. 6149/CHE/2013, filed on Dec. 30, 2013 in the India Patent Office, the disclosure of which is incorporated herein by reference in its entirety.

BACKGROUND

1. Field

The present invention relates to the field of authenticating a network device in a location based verification framework and more specifically, authenticating the network device and generating a location based data encryption key for the network device.

2. Description of the Prior Art

Existing smart electronic devices, for example, smart TV, smart phones, and smart music systems come with wireless networking capabilities. However, these electronic devices use various wireless networking protocols to communicate. Middleware technologies such as Universal Plug and Play networking (UPnP) provide a unified system for electronic devices running on different wireless networking technologies to connect and transfer data. Electronic devices compatible with UPnP system are known as UPnP devices. Wireless networks compatible with UPnP are referred as UPnP wireless networks.

A UPnP device dynamically connects to a UPnP wireless network, obtains an Internet Protocol (IP) address, conveys device capabilities of the UPnP device, and learns about presence and device capabilities of other UPnP devices in the UPnP wireless network without user intervention. The UPnP wireless network is an ad hoc network. Messages are broadcasted through wireless channels in the UPnP wireless network. The messages broadcasted through the wireless channels are susceptible to security attacks by unauthorized UPnP devices. Examples of security attacks by unauthorized UPnP devices include but are not limited to passive interception of data messages, active injection of network traffic, overloading of the UPnP wireless network with garbage messages, and unauthorized modification of messages. UPnP wireless networks maintain security and confidentiality of the messages by authenticating UPnP devices in the vicinity and encrypting the messages with a suitable cryptographic scheme. Existing systems employ several cryptographic schemes to encrypt the messages.

In one existing prior art, the UPnP wireless network perform symmetric-key cryptographic schemes to encrypt messages. In the symmetric-key cryptographic scheme, a sender UPnP device and a receiver UPnP device in the UPnP wireless network share an encryption key. The encryption key is used to encrypt and decrypt the message sent between the sender UPnP device and the receiver UPnP device in the UPnP wireless network via a secure communication line. However, with symmetric-key cryptographic scheme, each pair of UPnP devices in the UPnP wireless network requires a different encryption key. As a result, each UPnP device in the UPnP wireless network stores encryption keys for possible combination of pairs of UPnP devices in the UPnP wireless network. With symmetric-key cryptographic scheme, the UPnP devices in the UPnP wireless network have large memory requirements. Moreover, cost of the UPnP devices in the UPnP wireless network increases with memory requirements. As a result, symmetric-key cryptography schemes are not economically feasible for implementation in the UPnP wireless network due to high costs of the UPnP devices in the UPnP wireless network. Moreover, symmetry-key cryptography schemes are not economically feasible for implementation in network device authentication the UPnP wireless network.

In another existing prior art, the UPnP wireless network perform public-key cryptographic schemes to encrypt messages. The UPnP wireless network with the public-key cryptographic schemes utilizes a public encryption key to encrypt messages and a private decryption key to decrypt the messages. The public encryption key and a private decryption key are stored in each UPnP device in the UPnP wireless network. However, public-key cryptography scheme is complex, and slow. Moreover, power consumption in the UPnP wireless network with public-key cryptography scheme is high and drains the battery power of the UPnP devices rapidly. As a result, public key cryptography schemes are not feasible for implementation in the UPnP wireless network due to hardware constraints of the UPnP devices in the UPnP wireless network.

In light of the foregoing discussion, there is a need for a fast, simple and memory efficient method to authenticate UPnP devices in a wireless network and generate a location based data encryption key for the UPnP devices for encrypting messages transmitted in the wireless network.

SUMMARY

The above mentioned needs are met by authenticating a network device in a location based data encryption key for a network device in a location based verification framework. The method includes verifying location of the network device. Further, location based data encryption key is generated from location of the network device which is shared between the network devices for authentication of the verifying network device.

An example of a method of authenticating a network device includes providing identification information of a first network device to a second network device and a third network device. The identification information includes location information of the first network device and a timestamp. The method includes verifying the location information of the first network device by a hyperbolic verification scheme. The verification is performed by the second network device and the third network device. The method includes authenticating the first network device based on the verification.

An example of a method of authenticating a network device in a location based verification framework includes transmitting a first message from the network device via a network, wherein the first message comprises a timestamp indicating time of broadcast of the first message. The method includes calculating distance of the network device from a first verifier device, wherein the distance of the network device from the first verifier device is proportional to time taken by the message to propagate from the network device to the first verifier device. The method includes calculating distance of the network device from a second verifier device, wherein the distance of the network device from the second verifier device is proportional to time taken by the message to propagate from the network device to the second verifier device. The method includes verifying the location of the network device to be within a set of locations represented by a hyperbola. The method includes transmitting a second message from one of the first verifier device and the second verifier device. The method includes receiving a third message at the first verifier device and the second verifier device, wherein the network device sends the third message in response to the second message. The method includes authenticating the network device to the network.

An example of a system of authenticating a network device, the system includes a plurality of network devices. Further, the system includes a verifying module to verify location information of a network device. Furthermore, the system includes an authenticating module to authenticate the network device based on verification.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 5c illustrates a sub-step described in FIG. 5a, in accordance with one embodiment of the present invention;

FIG. 5e illustrates a sub-step described in FIG. 5a, in accordance with one embodiment of the present invention;

FIG. 7c illustrates a sub-step described in FIG. 7a, in accordance with one embodiment of the present invention;

FIG. 8c illustrates a sub-step described in FIG. 8a, in accordance with one embodiment of the present invention;

FIG. 8d illustrates a sub-step described in FIG. 8a, in accordance with one embodiment of the present invention;

FIG. 9b illustrates a sub-step described in FIG. 9a, in accordance with one embodiment of the present invention;

FIG. 10b illustrates a sub-step described in FIG. 10a, in accordance with one embodiment of the present invention.

DETAILED DESCRIPTION

Embodiments of the present disclosure described herein provide method and system for authentication of a first network device in a location based verification framework. Authentication of the network device includes verifying location of the network device relative to a second network device and a third network device in a network. The present invention protects a plurality of devices in the network from collusion attacks from malicious devices in the network. Further, the verification of the location of the network device occurs in the second network device and the third network device.

Figure 1:
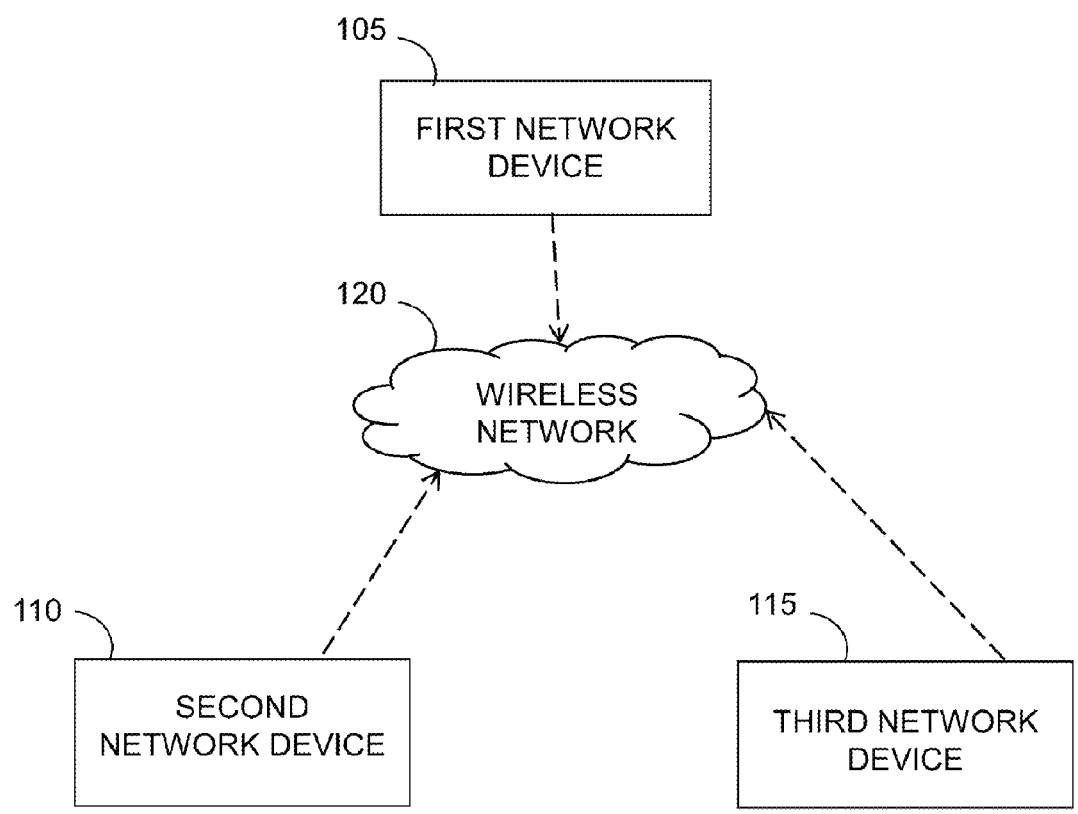
FIG. 1 is a block diagram of an environment, in accordance with which various embodiments of the present invention can be implemented.

FIG. 1 is a block diagram of an environment, in accordance with which various embodiments are implemented. The environment includes a plurality of network devices 105, 110, and 115. The plurality of network devices 105, 110, and 115 are in communication with each other via a wireless network 120. Examples of network devices among the plurality of network devices 105, 110, and 115 include but is not limited to smart phones, smart televisions, smart music systems, personal computers and personal digital assistants. Examples of the wireless network 120 include Wifi networks, Wimax networks, Near field communication networks (NFC), sound based communication networks, multimedia based communication networks and Bluetooth networks.

In one embodiment of the present invention, network devices among the plurality of network devices 105, 110, and 115 are compatible with Universal Plug and Play networking (UPnP). Moreover, the wireless network 120 is compatible with UPnP. UPnP enables the network devices among the plurality of network devices 105, 110, and 115 to dynamically connect to the wireless network 120 without user intervention. Moreover, the network devices among the plurality of network devices 105, 110, and 115 have a location based verification framework. The location based verification framework performs location based authentication of a prover device in the wireless network 120. The prover device is an unauthenticated network device in vicinity of the wireless network 120. The location based verification framework detects the presence of the prover device in the vicinity of the wireless network 120. Further, the location based verification framework performs location based authentication in verifier devices of the wireless network 120. The verifier devices are authenticated network devices in the wireless network 120. Moreover, the verifier devices are stationary and tamper proof devices. The verifier devices in the wireless network 120 are selected from the plurality of network devices in the wireless network 120. A first network device 105 and a second network device 110 are the verifier devices in the wireless network 120. A third network device 115 is the prover device in the wireless network 120. A verifier device is capable of communicating to other verifier devices in the wireless network 120 over a secure communication channel.

The location based authentication of the prover device includes verifying location of the prover device. During the location based authentication, the prover device state a claim to a location to the verifier devices. The claim includes information about the location of the prover device and a timestamp. The verifier devices verify the claim of the prover device to the location. The verification of claim to the location of the prover device is performed by a hyperbolic location verification scheme. The hyperbolic location verification scheme includes calculating distance from the third network device 115 and the first network device 105 and distance from the third network device 115 and the second network device 110. The method of calculating distance between the prover device and the verifier device is explained in detail in FIG. 2. The hyperbolic location verification scheme verifies location of the third network device 115 to lie on a hyperbola. It is noted that focal points of the hyperbola lie on the first network device 105 and the second network device 110.

Figure 2:
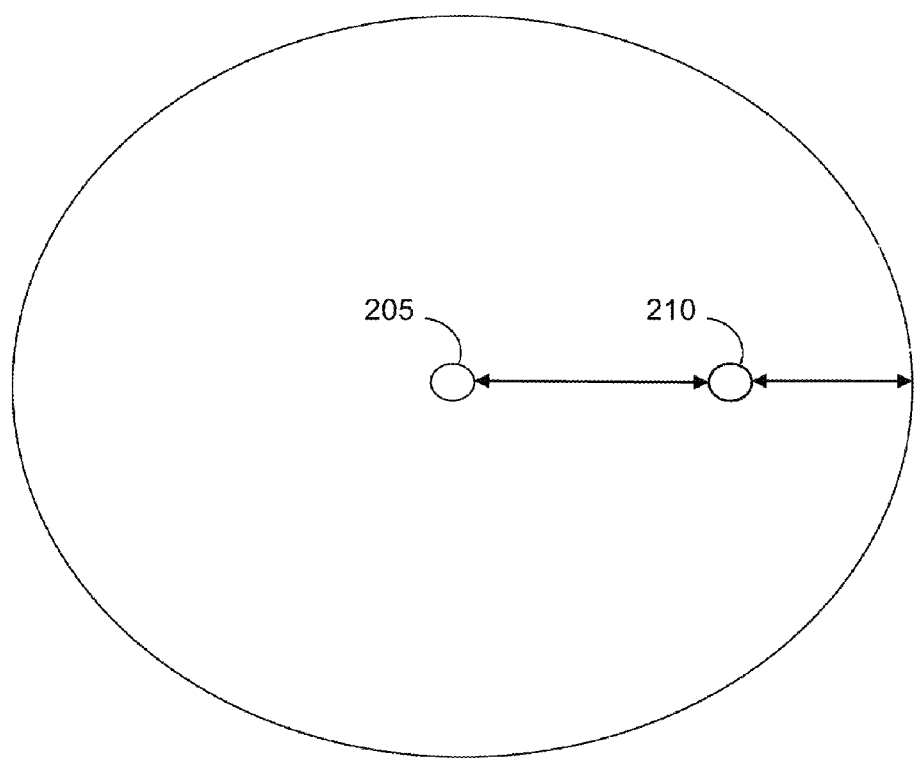
FIG. 2 is an exemplary illustration of calculating distance between a verifier device and a prover device, in accordance with one embodiment of the present invention.

Referring to FIG. 2 now, a system for calculating the distance between a verifier device 205 and a prover device 210 is shown. The verifier device 205 and the prover device 210 are capable of wireless communication and are compatible with Universal plug and play networking (UPnP). The prover device 210 broadcasts a message to the verifier device 205 with a timestamp. The timestamp contains time of broadcast of the message from the prover device 210. Time elapsed between time at an instance when the message reaches the verifier device 205 and the time of broadcast of the message from the prover device 210 is proportional to the distance between the prover device 210 and the verifier device 205. Distance between the prover device 210 and the verifier device 205 is calculated from the time elapsed.

Figure 3:
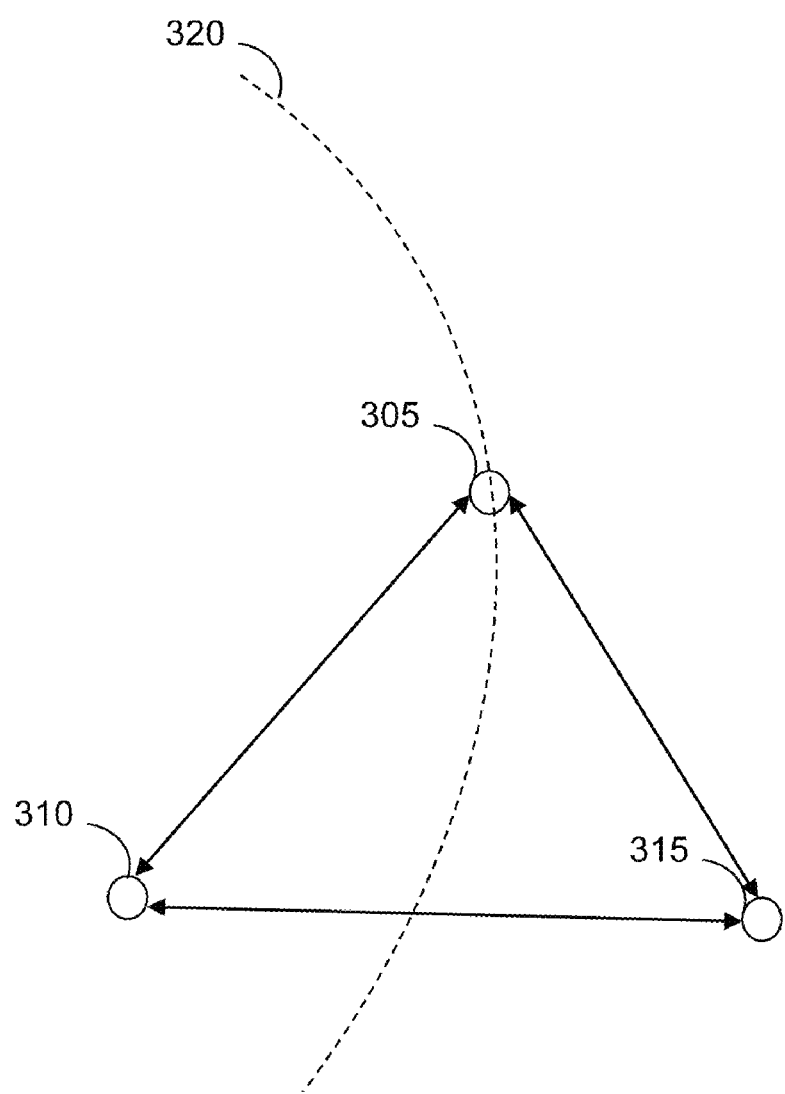
FIG. 3 is an exemplary illustration of hyperbolic location verification scheme, in accordance with one embodiment of the present invention.

FIG. 3 is a block diagram depicting hyperbolic location verification in accordance with one embodiment of the present invention. The block diagram FIG. 3 includes a prover device 305, a first verifier device 310, and a second verifier device 315. The first verifier device 310, the second verifier device 315 and the prover device 305 are capable of wireless communication and are compatible with Universal plug and play networking (UPnP). The prover device 305 broadcasts a message to the first verifier device 310 the second verifier device 315. The message includes a timestamp. The timestamp contains time of broadcast of the message from the prover device 305. The time difference between time at a first instance when the message reaches the first verifier device 310 and the time of broadcast of the message from the prover device 305 is proportional to the distance between the prover device 305 and the verifier device 315. A first distance between the prover device 305 and the first verifier device 310 is calculated from the time difference between time at the instance when the message reaches the first verifier device 310 and the time of broadcast of the message from the prover device 305. A second distance between the prover device 305 and the second verifier device 315 is calculated from the time difference between time at the instance when the message reaches the second verifier device 315 and the time of broadcast of the message from the prover device 305. The first verifier device 310 and the second verifier device 315 calculate the location of the prover device 305 from the first distance and the second distance. The location based verification framework verifies whether the location of device is a set of locations bounded by a hyperbola 320 with the first verifier device 310 and the second verifier device 315 as focal points of the hyperbola 320.

Figure 4:
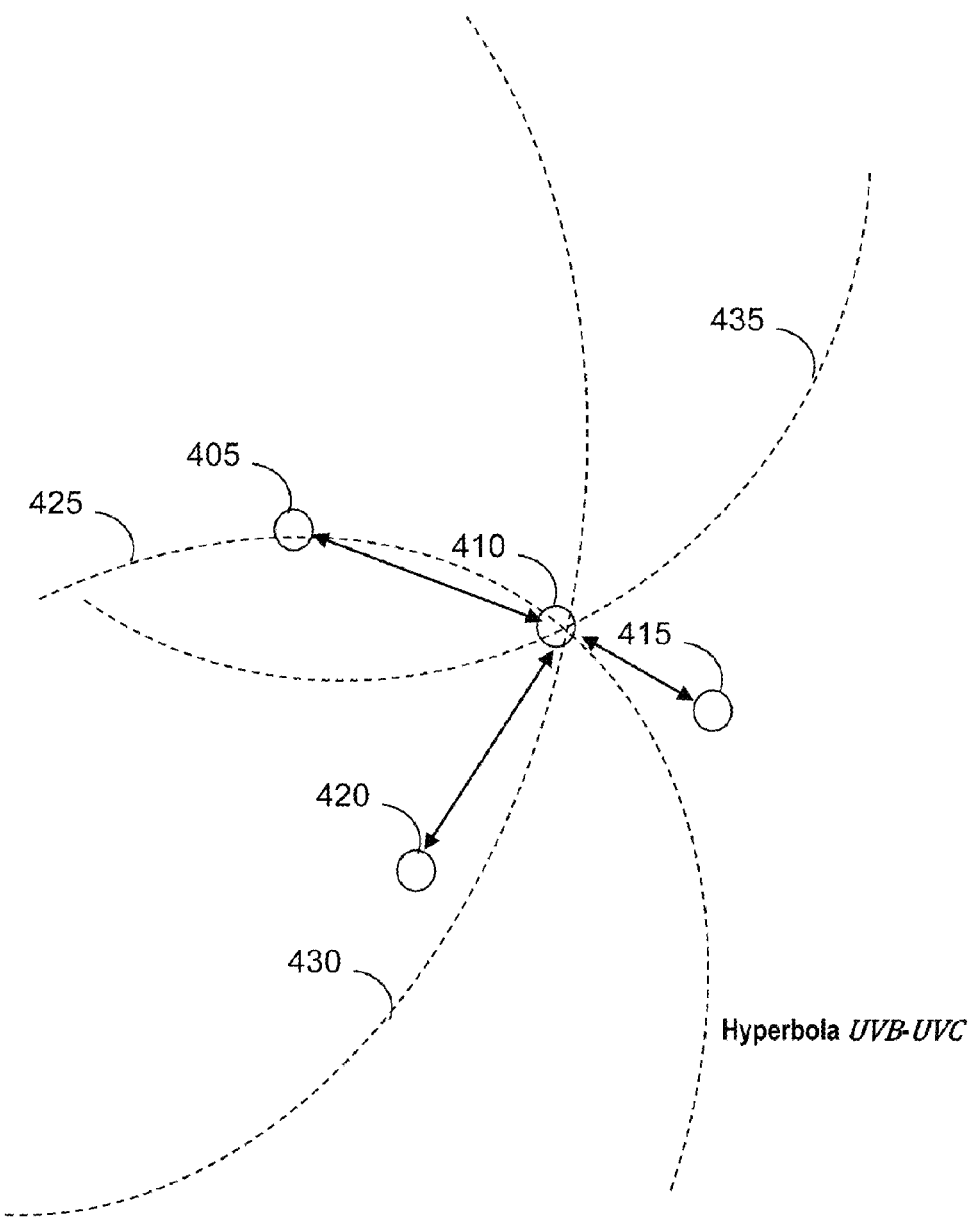
FIG. 4 is an exemplary illustration of depicting hyperbolic location verification scheme, in accordance with another embodiment of the present invention.

FIG. 4 is a block diagram depicting hyperbolic location verification in accordance with another embodiment of the present invention. The block diagram FIG. 4 includes a first verifier device 405, a prover device 410, a second verifier device 415, and a third verifier device 420. The first verifier device 405, the second verifier device 415, the third verifier device 420, and the prover device 410 are capable of wireless communication and are compatible with Universal plug and play networking (UPnP). The prover device 410 broadcasts a message to the first verifier device 405, the second verifier device 415, and the third verifier device 420. The message includes a timestamp. The timestamp contains time of broadcast of the message from the prover device 410.

A first instance indicates the time when the message reaches the first verifier device 405. The time difference between time at the first instance and the time of broadcast of the message from the prover device 410 indicates time taken for the message to propagate from the prover device 410 to the first verifier device 405. Time taken for the message to propagate from the prover device 410 to the first verifier device 405 is proportional to the distance between the prover device 410 and the first verifier device 405. A first distance between the prover device 410 and the first verifier device 405 is calculated from the time difference between the first instance and the time of broadcast of the message from the prover device 410. A second distance between the prover device 410 and the second verifier device 415 is calculated from the time difference between a second instance when the message reaches the second verifier device 415 and the time of broadcast of the message from the prover device 410. A third distance between the prover device 305 and the third verifier device 420 is calculated from the time difference between a third instance when the message reaches the third verifier device 420 and the time of broadcast of the message from the prover device 410.

The first verifier device 405, the second verifier device 415, and the third verifier device 420 calculates the location of the prover device 410 from the first distance, the second distance and the third distance. The location based verification framework verifies if the location of device is within the point of intersection of a first hyperbola 425, a second hyperbola 430, and a third hyperbola 435. The first hyperbola 425 has the first verifier device 405 and the second verifier device 415 as focal points. The second hyperbola 430 has the second verifier device 415 and the third verifier device 420 as focal points. The third hyperbola 435 has the first verifier device 405 and the third verifier device 420 as focal points.

Figure 5A:
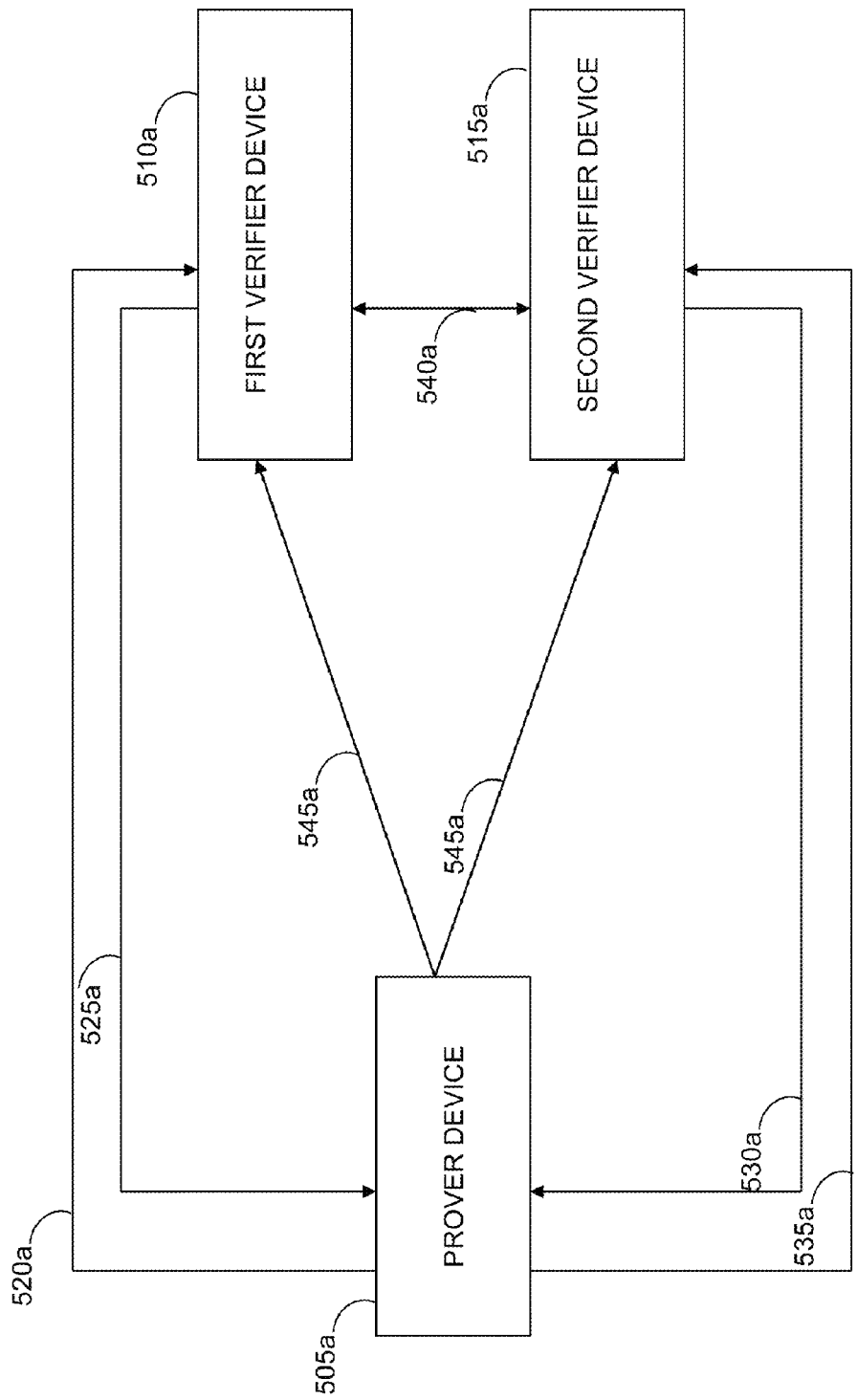
FIG. 5a is an exemplary illustration of location based verification of a prover device, in accordance with one embodiment of the present invention.

FIG. 5a is an exemplary illustration of a use case of location based verification with a prover device 505a, a first verifier device 510a and a second verifier device 515a in accordance with one embodiment of the present invention. FIG. 5a includes the prover device 505a, the first verifier device 510a, and the second verifier device 515a. The first verifier device 510a, the second verifier device 515a, and the prover device 505a are capable of wireless communication and are compatible with Universal plug and play networking (UPnP). Moreover, the prover device 505a has location information of the first verifier device 510a and the second verifier device 515a. As a result, the prover device 505a is capable of forging a false location claim to the first verifier device 510a and the second verifier device 515a.

The first verifier device 510a and the second verifier device 515a performs location based authentication of the prover device 505a. The location based authentication of the prover device 505a includes verification of the location of the prover device 505a. The verification of location of the prover device 505a is interactive and includes a plurality of steps, also referred to as sub-steps 520a, 525a, 530a, 535a, 540a, and 545a. The prover device 505a broadcasts a message to the first verifier device 510a and the second verifier device 515a as shown in step 545a.

The message includes a timestamp indicating the time of broadcast of the message (Ts). The step 545a is explained in conjunction to FIG. 5b. The first verifier device 510a and the second verifier device 515a verify the location of the prover device 505a by hyperbolic verification scheme which is further explained in conjunction with FIG. 3. Further, the location based authentication method randomly follows step 525a and step 530a. In step 525a, the first verifier device 510a sends a nonce message to the prover device 505a. The main proposal here deals with making the position and time stamp of a verifier unknown to the prover device 505a. In step 530a, the second verifier device 515a sends a nonce message to the prover device 505a. Probability of location based verification framework authenticating prover nodes with forged location claims is reduced by fifty percent by randomly selecting one of a step 525a and a step 530a. If the location based authentication system utilizes step 525a, the prover device 505a follows a step 520a. In the step 520a, the prover device 505a sends a nonce message to the first verifier device 510a and the second verifier device 515a. The location based verification framework correctly authenticates the prover device 505a with a fifty percent probability in the use case illustrated in FIG. 5a. A location based verification framework generates a location based data encryption key for the prover device 505a after authentication. The location based data encryption key is generated from electronic data representing the location of the prover device 505a.

Figure 5B:
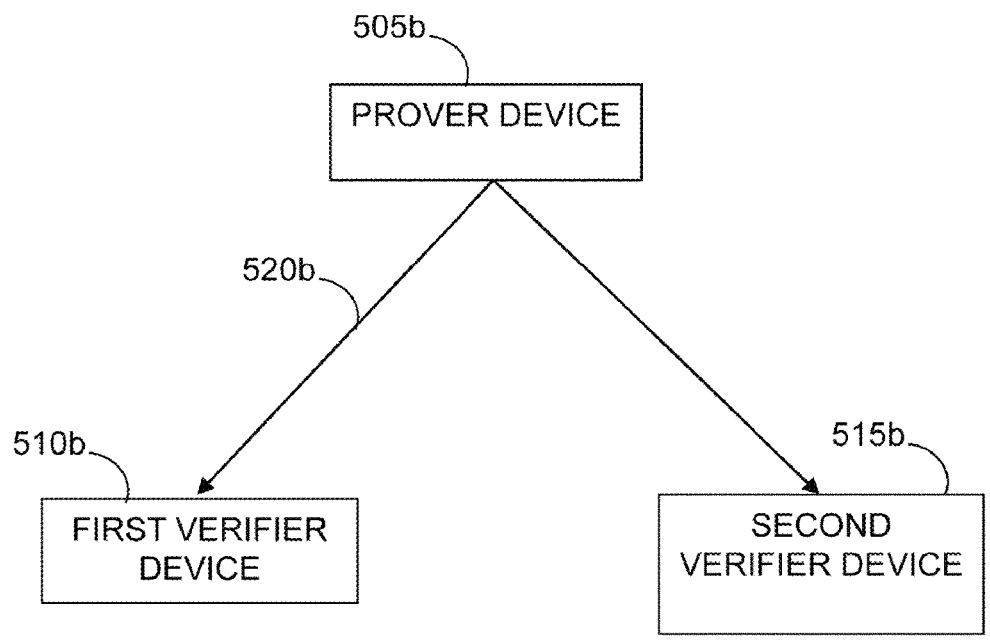
FIG. 5b illustrates a sub-step described in FIG. 5a, in accordance with one embodiment of the present invention.

FIG. 5b is a block diagram describing the sub-step 545a in FIG. 5a in accordance with one embodiment of the present invention. FIG. 5b includes a prover device 505b, a first verifier device 510b, and a second verifier device 515b. The first verifier device 510b, the second verifier device 515b, and the prover device 505b are capable of wireless communication and are compatible with Universal plug and play networking (UPnP). The prover device 505b broadcasts a message to the first verifier device 510b and the second verifier device 515b at a step 520b. The message includes a timestamp indicating the time of broadcast of the message (Ts).

FIG. 5c is a block diagram describing hyperbolic location verification in the use case described in FIG. 5a in accordance with one embodiment of the present invention. FIG. 5c includes a prover device 505c, a first verifier device 510c, and a second verifier device 515c. The first verifier device 510c, the second verifier device 515c, and the prover device 505c are capable of wireless communication and are compatible with Universal plug and play networking (UPnP). The prover device 505c broadcasts a message to the first verifier device 510c the second verifier device 515c with a timestamp. The message is broadcasted at a step 520c. The timestamp contains time of broadcast of the message from the prover device 505c. The time difference between time at a first instance when the message reaches the first verifier device 510c and the time of broadcast of the message from the prover device 505c is proportional to the distance between the prover device 505c and the first verifier device 510c. A first distance between the prover device 505c and the first verifier device 510c is calculated from the time difference between time at the instance when the message reaches the first verifier device 510c and the time of broadcast of the message from the prover device 505c. A second distance between the prover device 505c and the second verifier device 515c is calculated from the time difference between time at the instance when the message reaches the second verifier device 515c and the time of broadcast of the message from the prover device 505c.

The first verifier device 510c and the second verifier device 515c calculate the location of the prover device 505c from the first distance and the second distance at a step 525c. The location based verification framework verifies if the location of device is a set of locations bounded by a hyperbola with positions of the first verifier device 510c and the second verifier device 515c as focal points of the hyperbola.

Figure 5D:
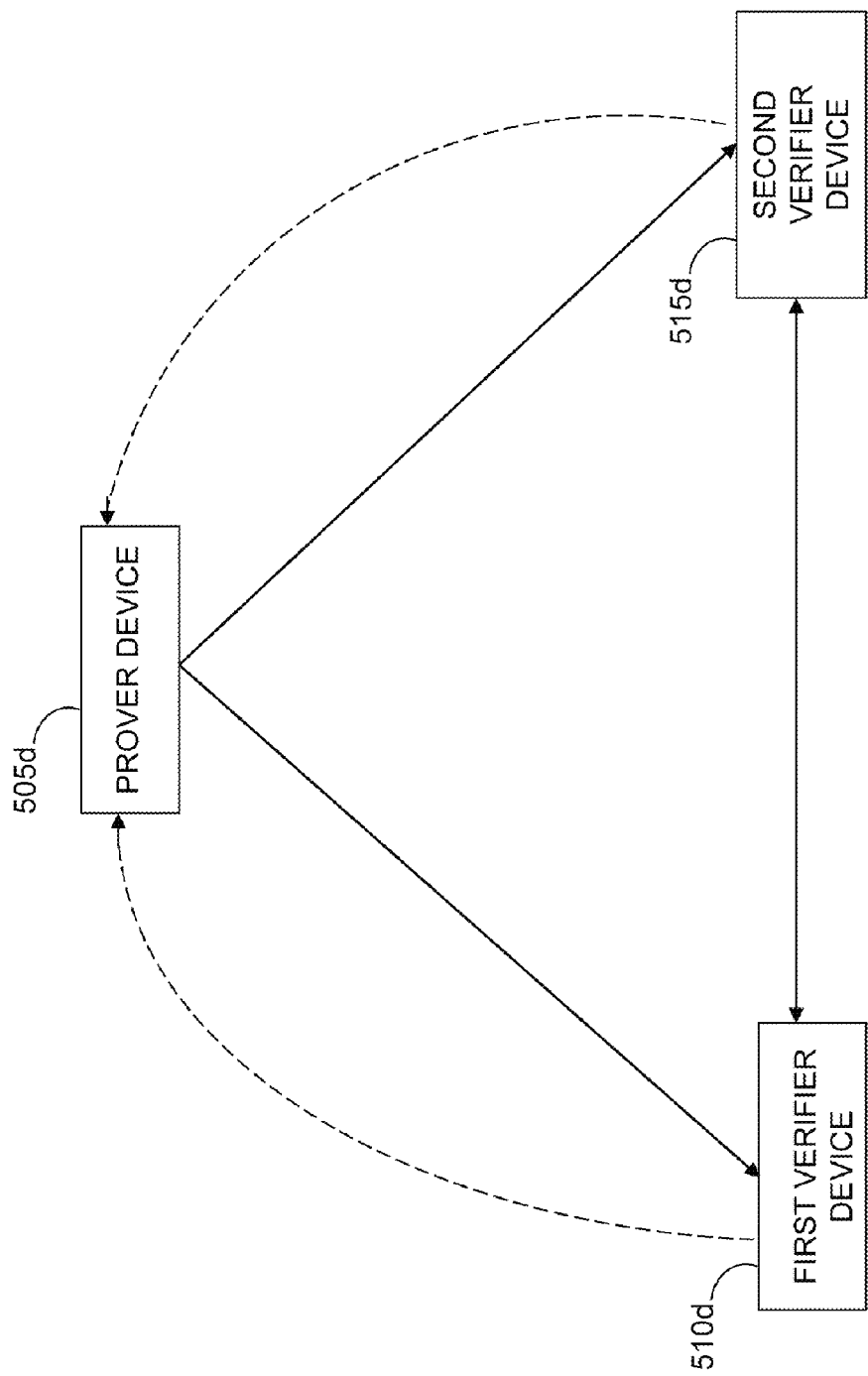
FIG. 5d illustrates a sub-step described in FIG. 5a, in accordance with one embodiment of the present invention.

FIG. 5d is a block diagram describing the step 525a and the step 530a in the use case described in FIG. 5a in accordance with one embodiment of the present invention. FIG. 5d includes a prover device 505d, a first verifier device 510d, and a second verifier device 515d. The first verifier device 510d, the second verifier device 515d, and the prover device 505d are capable of wireless communication and are compatible with Universal plug and play networking (UPnP). In one method, the first verifier device 510d sends a nonce message to the prover device 505d. In another method, the second verifier device 515d sends a nonce message to the prover device 505d.

FIG. 5e is a block diagram describing a sub-step in the use case described in FIG. 5a in accordance with one embodiment of the present invention. FIG. 5e includes a prover device 505e, a first verifier device 510e, and a second verifier device 515e. The first verifier device 510e, the second verifier device 515e, and the prover device 505e are capable of wireless communication and are compatible with Universal plug and play networking (UPnP). In one method, the prover device 505e sends a nonce message to the first verifier device 510e and the second verifier device 515e. The location based authentication system correctly authenticates the prover device 505e with a probability of fifty percent.

Figure 6A:
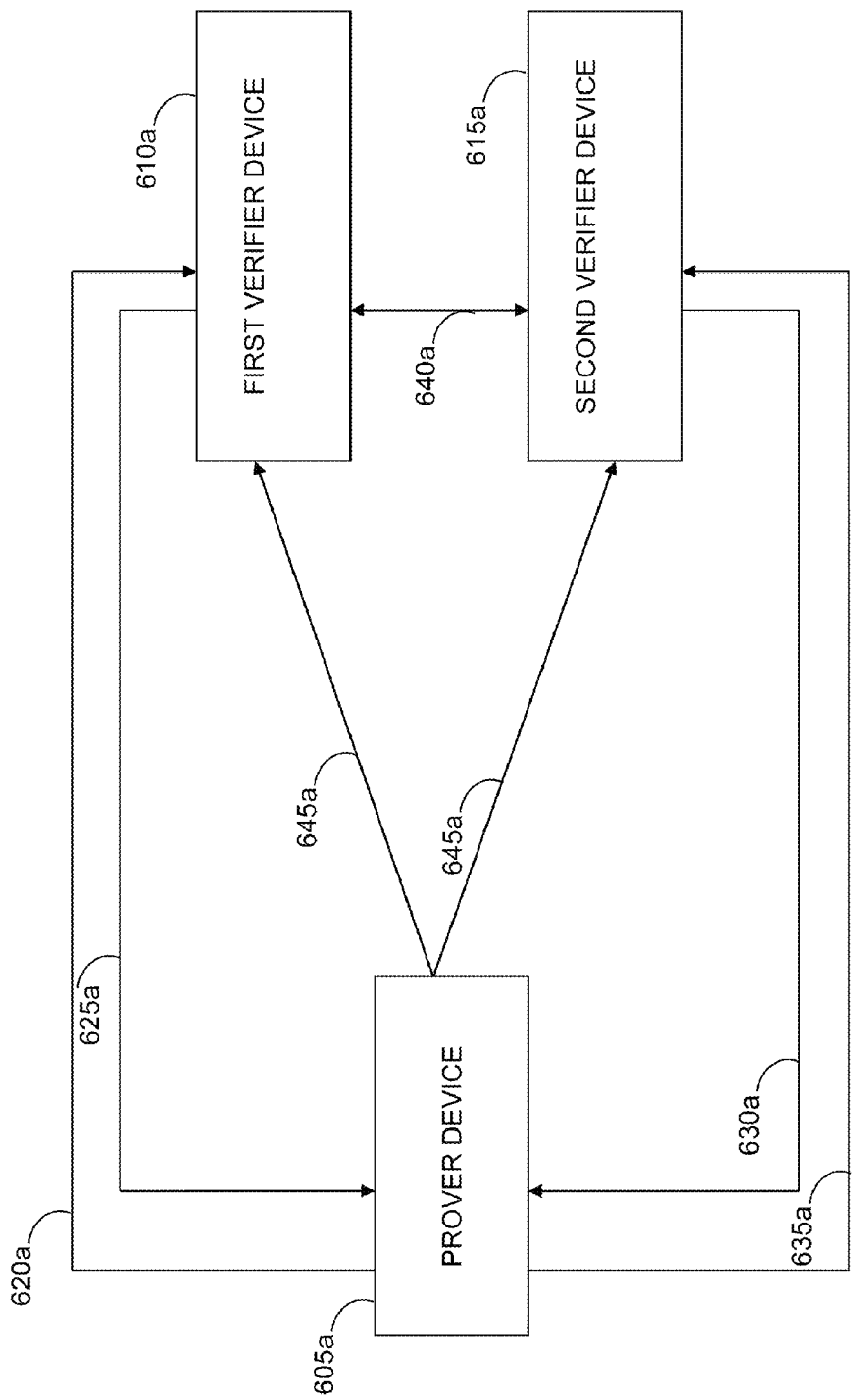
FIG. 6a is an exemplary illustration of location based verification of a prover device, in accordance with another embodiment of the present invention.

FIG. 6a is another exemplary illustration of a use case of location based verification with a prover device 605a, a first verifier device 610a and a second verifier device 615a in accordance with one embodiment of the present invention. FIG. 6a includes a prover device 605a, a first verifier device 610a, and a second verifier device 615a. The first verifier device 610a, the second verifier device 615a, and the prover device 605a are capable of wireless communication and are compatible with Universal plug and play networking (UPnP). Moreover, the prover device 605a lacks location information of the first verifier device 610a and the second verifier device 615a. The first verifier device 610a and the second verifier device 615a performs location based authentication of the prover device 605a. The location based authentication of the prover device 605a includes verification of the location of the prover device 605a. The verification of location of the prover device 605a is non-interactive and includes a plurality of steps 620a, 625a, 630a, 635a, 640a, and 645a.

The prover device 605a broadcasts a message to the first verifier device 610a and the second verifier device 615a at a step 645a. The message includes a timestamp indicating the time of broadcast of the message (Ts). The step 645a is explained in conjunction to FIG. 6b. The first verifier device 610a and the second verifier device 615a verify the location of the prover device 605a by hyperbolic verification scheme described in conjunction with FIG. 3.

The location of the prover device 605a is correctly verified by the hyperbolic verification scheme. The location based authentication method randomly follows one of a step 625a and a step 630a. In the step 625a, the first verifier device 610a sends a nonce message to the prover device 605a. In the step 630a, the second verifier device 615a sends a nonce message to the prover device 605a. If the location based authentication method followed the step 625a, the prover device 605a follows a step 620a. In the step 620a, the prover device 605a sends a nonce message to the first verifier device 610a and the second verifier device 615a. A location based verification framework generates a location based data encryption key for the prover device 605a after authentication. The location based data encryption key is generated from electronic data representing the location of the prover device 605a.

Figure 6B:
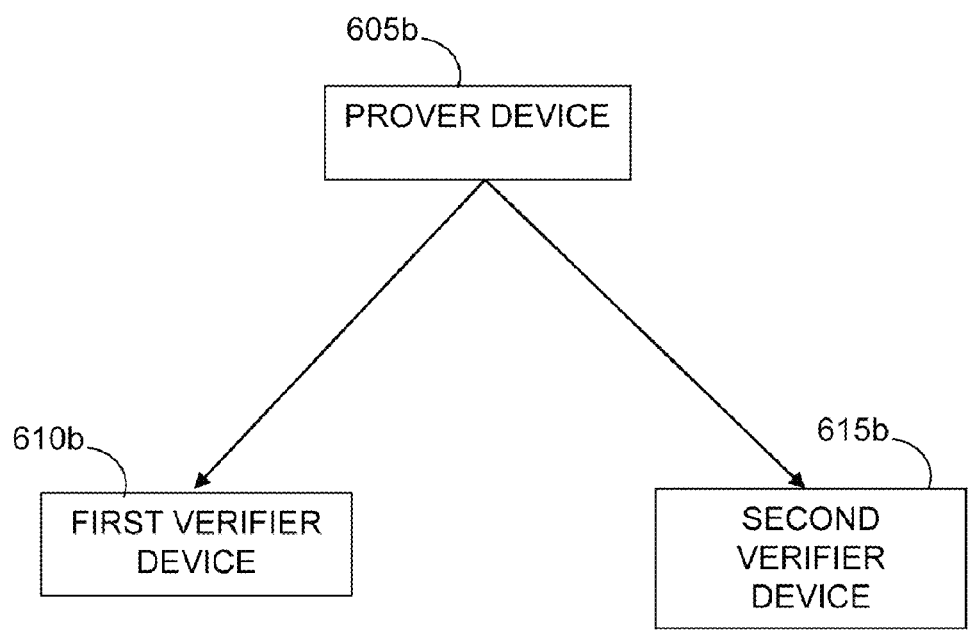
FIG. 6b illustrates a sub-step described in FIG. 6a, in accordance with one embodiment of the present invention.

FIG. 6b is a block diagram describing the sub-step in FIG. 6a in accordance with one embodiment of the present invention. FIG. 6b includes a prover device 605b, a first verifier device 610b, and a second verifier device 615b. The first verifier device 610b, the second verifier device 615b, and the prover device 605b are capable of wireless communication and are compatible with Universal plug and play networking (UPnP). The prover device 605b broadcasts a message to the first verifier device 610b and the second verifier device 615b. The message includes a timestamp indicating the time of broadcast of the message (Ts).

Figure 6C:
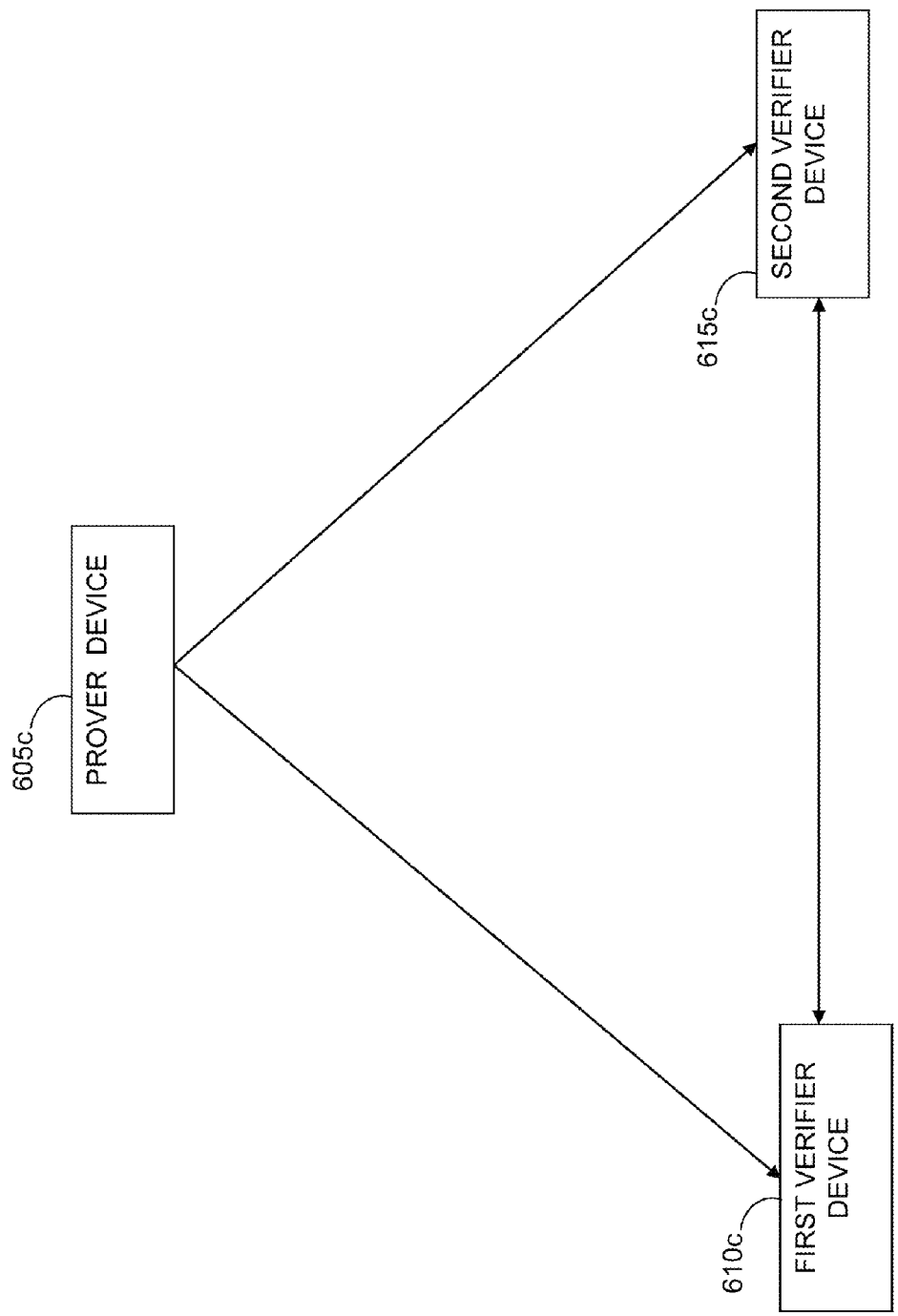
FIG. 6c illustrates a sub-step described in FIG. 6a, in accordance with one embodiment of the present invention.

FIG. 6c is a block diagram describing hyperbolic location verification in the use case described in FIG. 6a in accordance with one embodiment of the present invention. FIG. 6c includes a prover device 605c, a first verifier device 610c, and a second verifier device 615c. The first verifier device 610c, the second verifier device 615c, and the prover device 605c are capable of wireless communication and are compatible with Universal plug and play networking (UPnP). The prover device 605c broadcasts a message to the first verifier device 610c the second verifier device 615c with a timestamp. The timestamp contains time of broadcast of the message from the prover device 605.

The time difference between time at a first instance when the message reaches the first verifier device 610c and the time of broadcast of the message from the prover device 605c is proportional to the distance between the prover device 605c and the first verifier device 610c. A first distance between the prover device 605c and the first verifier device 610c is calculated from the time difference between time at the instance when the message reaches the first verifier device 610c and the time of broadcast of the message from the prover device 605c.

A second distance between the prover device 605c and the second verifier device 615c is calculated from the time difference between time at the instance when the message reaches the second verifier device 615c and the time of broadcast of the message from the prover device 605c. The first verifier device 610c and the second verifier device 615c calculate the location of the prover device 605c from the first distance and the second distance. The location based verification framework verifies if the location of device is a set of locations bounded by a hyperbola with positions of the first verifier device 610c and the second verifier device 615c as focal points of the hyperbola. The prover device 605c cannot forge a claim with the locus of the hyperbola and hence it cannot manipulate the timestamp in accordance to its claimed location. The first verifier device 610c and second verifier device 615c succeed in verifying the prover device's 605c location claim.

Figure 7A:
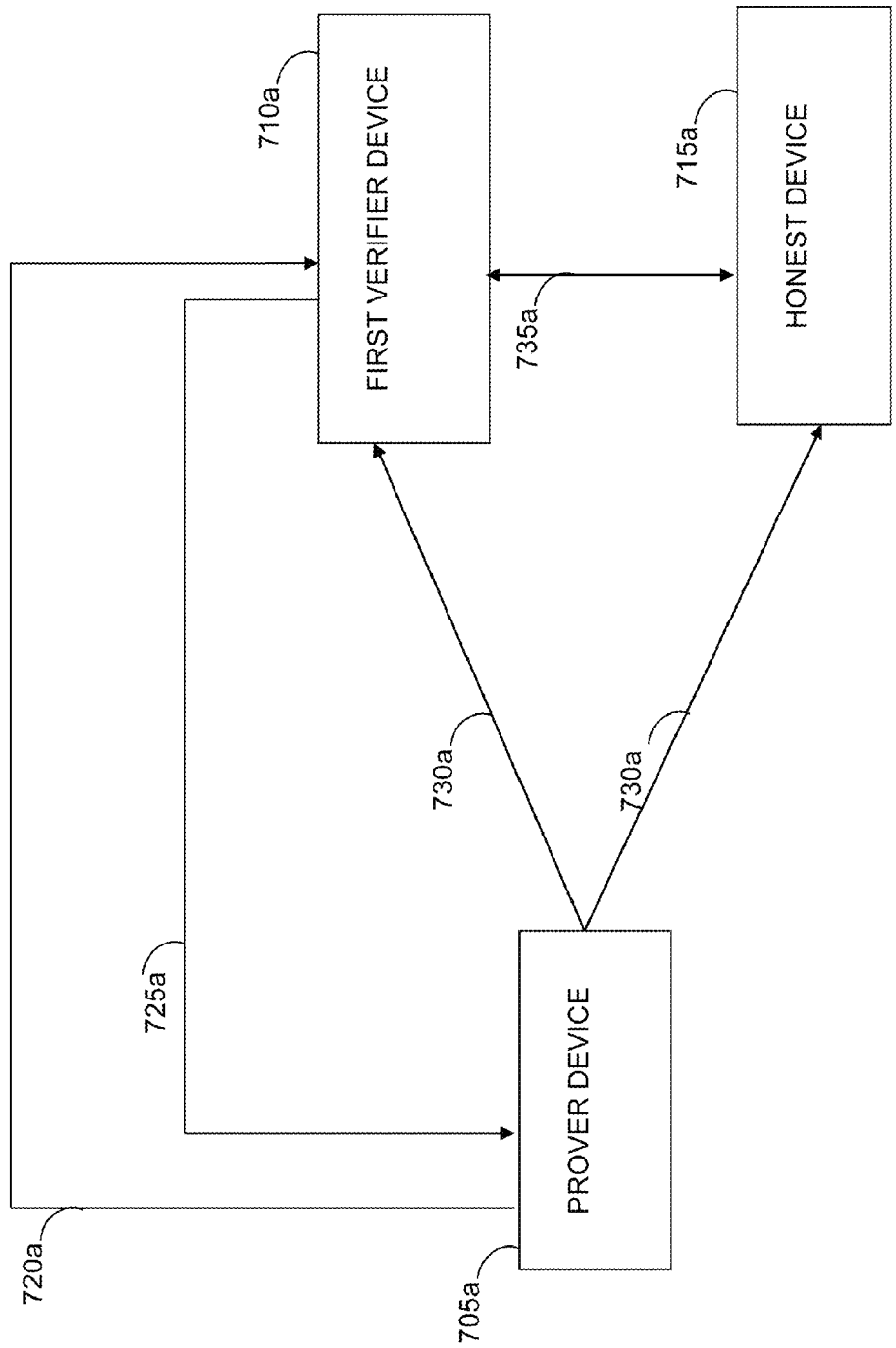
FIG. 7a is an exemplary illustration of location based verification of a prover device, in accordance with another embodiment of the present invention.

FIG. 7a is yet another exemplary illustration of a use case of location based verification with a prover device 705a, a first verifier device 710a and a second verifier device 715a in accordance with one embodiment of the present invention. FIG. 7a includes the prover device 705a, the verifier device 710a, and the honest device 715a. The honest devices are network devices authenticated by a location based authentication system. The honest devices are functionally identical to verifier devices. The verifier device 710a, the honest device 715a, and the prover device 705a are capable of wireless communication and are compatible with Universal plug and play networking (UPnP). Moreover, the prover device 705a has location information of the verifier device 710a and the honest device 715a. The verifier device 710a and the honest device 715a performs location based authentication of the prover device 705a.

The location based authentication of the prover device 705a includes verification of the location of the prover device 705a. The verification of location of the prover device 705a is interactive and includes a plurality of steps 720a, 725a, 730a, and 735a. The prover device 705a broadcasts a message to the verifier device 710a and the honest device 715a at a first step 730a among the plurality of steps 720a, 725a, 730a, and 735a. The message includes a first timestamp indicating the time of broadcast of the message (Ts). The first step 730a is explained in conjunction to FIG. 7b. The verifier device 710a and the honest device 715a verify the location of the prover device 705a by hyperbolic verification scheme described in conjunction with FIG. 3. In a second step 725a, the verifier device 710a sends a first nonce message to the prover device 705a. In a third step 720a, the prover device 705a sends a second nonce message to the verifier device 710a and the honest device 715a. The second nonce message includes a second timestamp indicating time of broadcast of the second nonce message. The honest device 715a transmits a third timestamp indicating time of reception of the second nonce message at the honest device 715a to the verifier device 710a. The verifier device 710a verifies location the prover device 705a by hyperbolic verification scheme described in conjunction with FIG. 3 for a second time.

Figure 7B:
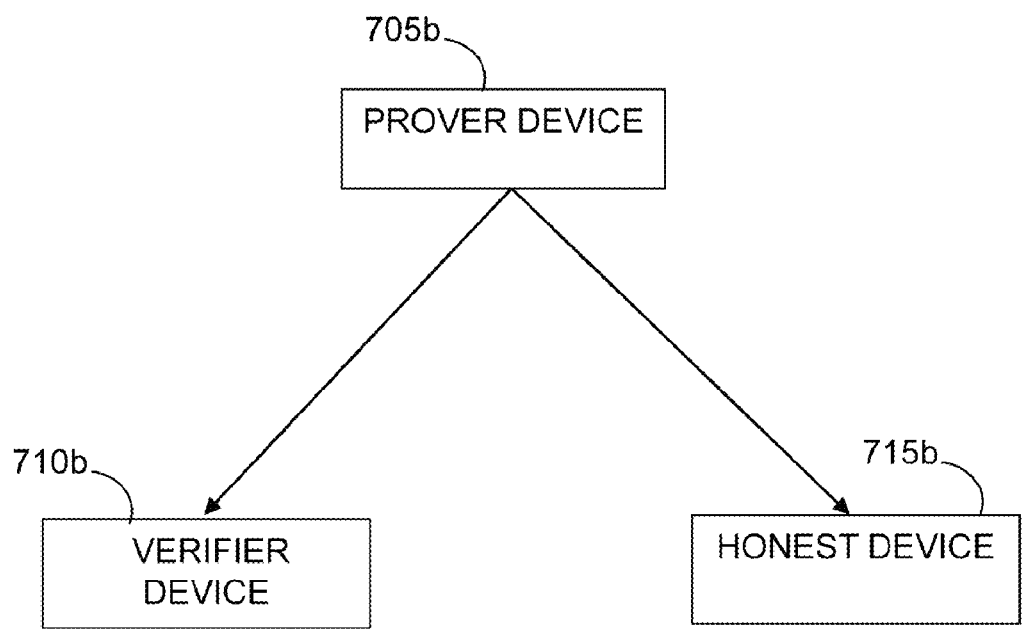
FIG. 7b illustrates a sub-step described in FIG. 7a, in accordance with one embodiment of the present invention.

FIG. 7b is a block diagram describing the first step 730a in FIG. 7a in accordance with one embodiment of the present invention. FIG. 7b includes a prover device 705b, a verifier device 710b, and an honest device 715b. The verifier device 710b, the honest device 715b, and the prover device 705b are capable of wireless communication and are compatible with Universal plug and play networking (UPnP). The prover device 705b broadcasts a message to the verifier device 710b and the honest device 715b. The message includes a timestamp indicating the time of broadcast of the message (Ts).

FIG. 7c is a block diagram describing hyperbolic location verification in the use case described in FIG. 7a in accordance with one embodiment of the present invention. FIG. 7c includes a prover device 705c, a verifier device 710c, and an honest device 715c. The first verifier device 710c, the honest device 715c, and the prover device 705c are capable of wireless communication and are compatible with Universal plug and play networking (UPnP). The prover device 705c broadcasts a message to the verifier device 710c the honest device 715c with a timestamp. The timestamp contains time of broadcast of the message from the prover device 705c. The time difference between time at a first instance when the message reaches the first verifier device 710c and the time of broadcast of the message from the prover device 705c is proportional to the distance between the prover device 705c and the verifier device 710c.

A first distance between the prover device 705c and the verifier device 710c is calculated from the time difference between time at the instance when the message reaches the verifier device 710c and the time of broadcast of the message from the prover device 705c. A second distance between the prover device 705c and the honest device 715c is calculated from the time difference between time at the instance when the message reaches the second verifier device 715c and the time of broadcast of the message from the prover device 705c.

The verifier device 710c and the honest device 715c calculate the location of the prover device 705c from the first distance and the second distance. The location based verification framework verifies if the location of device is a set of locations bounded by a hyperbola with positions of the first verifier device 710c and the honest device 715c as focal points of the hyperbola.

Figure 7D:
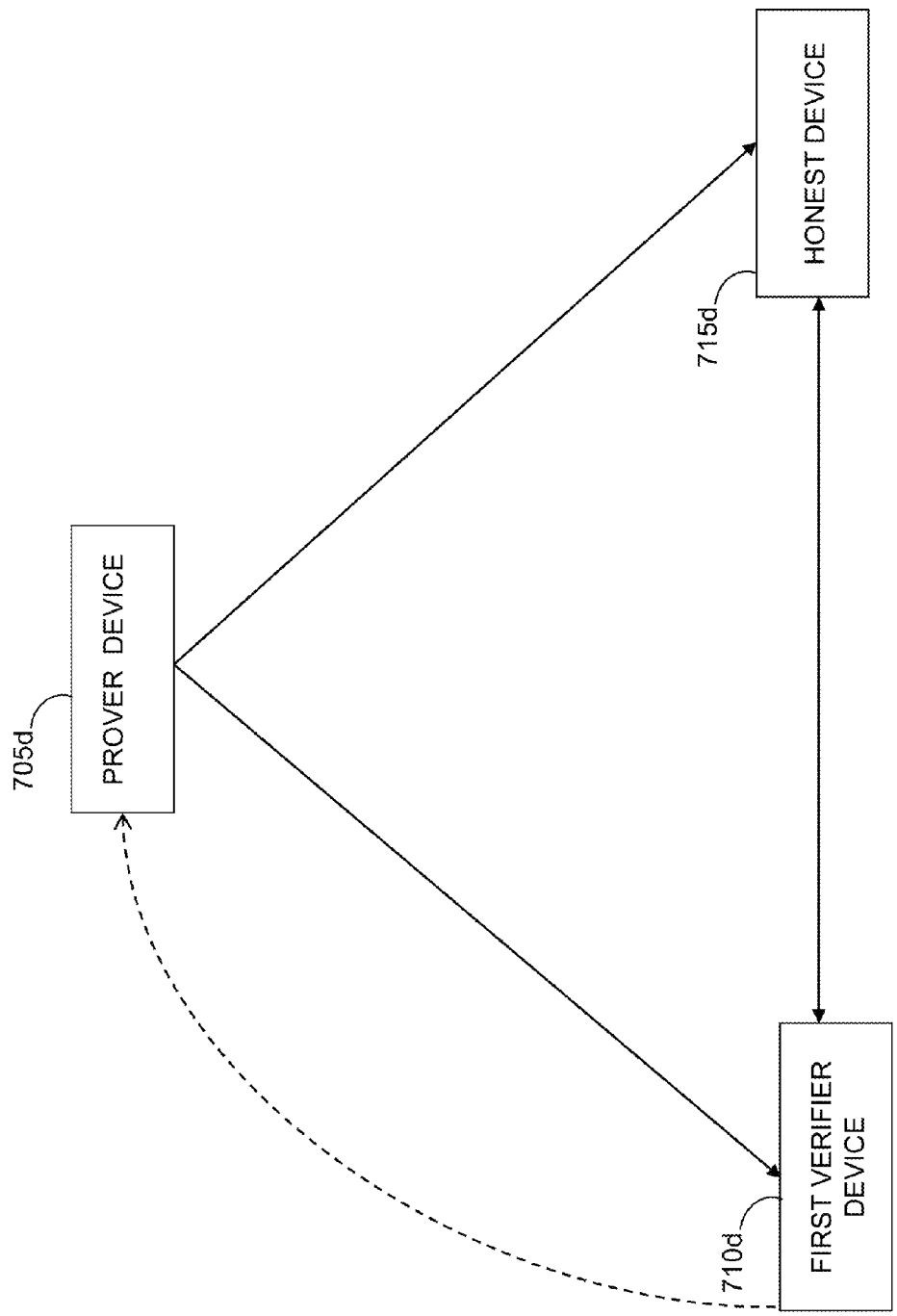
FIG. 7d illustrates a sub-step described in FIG. 7a, in accordance with one embodiment of the present invention.

FIG. 7d is a block diagram describing the third step 720a in the use case described in FIG. 7a in accordance with one embodiment of the present invention. FIG. 7d includes a prover device 705d, a verifier device 710d, and an honest device 715d. The verifier device 710d, the honest device 715d, and the prover device 705d are capable of wireless communication and are compatible with Universal plug and play networking (UPnP).

The prover device 705d sends a nonce message to the verifier device 710d and the honest device 715d. The nonce message includes a first timestamp indicating time of broadcast of the nonce message. The honest device 715d transmits a second timestamp indicating time of reception of the nonce message at the honest device 715d to the verifier device 710d. The verifier device 710d verifies location the prover device 705d by hyperbolic verification scheme described in conjunction with FIG. 3. Thus, enabling verifier device 710d and honest device 715d succeed in verifying the prover device's 705d location claim.

Figure 8A:
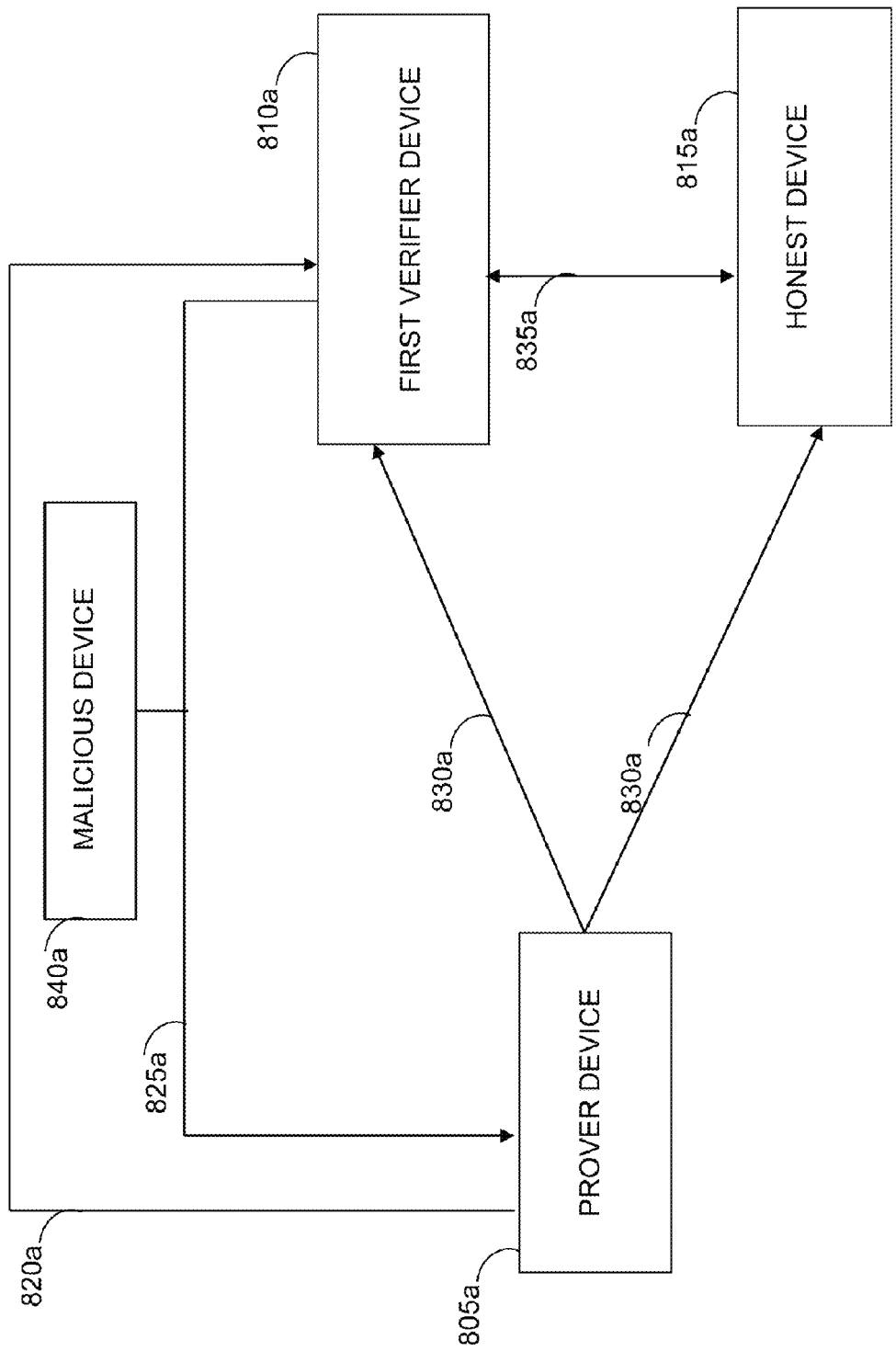
FIG. 8a is an exemplary illustration of location based verification of a prover device, in accordance with another embodiment of the present invention.

FIG. 8a is an exemplary illustration of a use case of location based verification with a prover device 805a, a verifier device 810a and an honest device 815a in accordance with one embodiment of the present invention. FIG. 8a includes the prover device 805a, the verifier device 810a, the honest device 815a, and a malicious device 840a. Malicious devices are unauthorized network devices in a network. Messages broadcasted via the network are susceptible to security attacks by the malicious devices in the network. Examples of security attacks by the malicious devices include but are not limited to passive interception of data messages, active injection of network traffic, overloading of the UPnP wireless network with garbage messages, and unauthorized modification of messages. The malicious devices compromise security of a network. Honest devices are network devices authenticated by a location based authentication system. The honest devices are functionally identical to verifier devices. The verifier device 810a, the honest device 815a, and the prover device 805a are capable of wireless communication and are compatible with Universal plug and play networking (UPnP). Moreover, the prover device 805a has location information of the verifier device 810a. The verifier device 810a and the honest device 815a performs location based authentication of the prover device 805a. The location based authentication of the prover device 805a includes verification of the location of the prover device 805a.

Figure 8B:
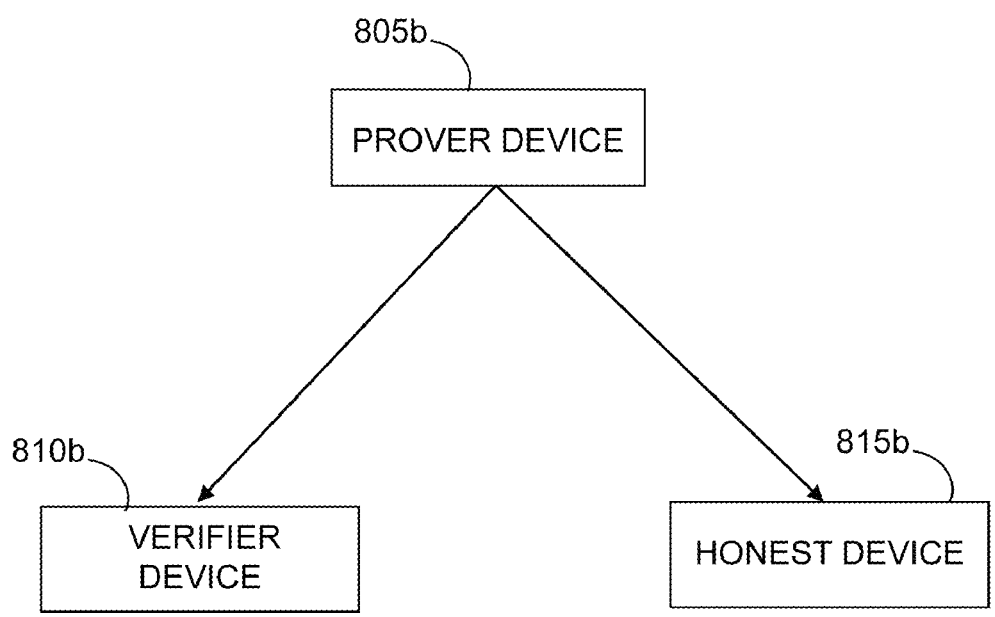
FIG. 8b illustrates a sub-step described in FIG. 8a, in accordance with one embodiment of the present invention.

The verification of location of the prover device 805a is interactive and includes a plurality of steps 820a, 825a, 830a, and 835a. The prover device 805a broadcasts a message to the verifier device 810a and the honest device 815a at a first step 830a among the plurality of steps 820a, 825a, 830a, and 835a. The message includes a first timestamp indicating the time of broadcast of the message (Ts). The first step 830a is explained in conjunction to FIG. 7b. The verifier device 810a and the honest device 815a verify the location of the prover device 805a by hyperbolic verification scheme described in conjunction with FIG. 3. In a second step 825a, the verifier device 810a sends a first nonce message to the prover device 805a. In a third step 820a, the prover device 805a sends a second nonce message to the verifier device 810a and the honest device 815a. The second nonce message includes a second timestamp indicating time of broadcast of the second nonce message. The honest device 815a transmits a third timestamp indicating time of reception of the second nonce message at the honest device 815a to the verifier device 810a. The verifier device 810a verifies location the prover device 805a by hyperbolic verification scheme described in conjunction with FIG. 3 for a second time. The malicious device 840a lacks location information of the honest device 815a. As a result, the malicious device 840a is prevented from manipulating the verifier device 810a into providing access to the network FIG. 8b is a block diagram describing the first step 830a in FIG. 7a in accordance with one embodiment of the present invention. FIG. 8b includes a prover device 805b, a verifier device 810b, and an honest device 815b. The verifier device 810b, the honest device 815b, and the prover device 805b are capable of wireless communication and are compatible with Universal plug and play networking (UPnP). The prover device 805b broadcasts a message to the verifier device 810b and the honest device 815b. The message includes a timestamp indicating the time of broadcast of the message (Ts).

FIG. 8c is a block diagram describing hyperbolic location verification in the use case described in FIG. 8a in accordance with one embodiment of the present invention. FIG. 8c includes a prover device 805c, a verifier device 810c, and an honest device 815c. The first verifier device 810c, the honest device 815c, and the prover device 805c are capable of wireless communication and are compatible with Universal plug and play networking (UPnP). The prover device 805c broadcasts a message to the verifier device 810c the honest device 815c with a timestamp. The timestamp contains time of broadcast of the message from the prover device 805c. The time difference between time at a first instance when the message reaches the first verifier device 810c and the time of broadcast of the message from the prover device 805c is proportional to the distance between the prover device 805c and the verifier device 810c. A first distance between the prover device 805c and the verifier device 810c is calculated from the time difference between time at the instance when the message reaches the verifier device 810*c* and the time of broadcast of the message from the prover device 805*c*.

A second distance between the prover device 805*c* and the honest device 815*c* is calculated from the time difference between time at the instance when the message reaches the honest device 815*c* and the time of broadcast of the message from the prover device 805*c*. The verifier device 810*c* and the honest device 815*c* calculate the location of the prover device 805*c* from the first distance and the second distance. The location based verification framework verifies if the location of device is a set of locations bounded by a hyperbola with positions of the first verifier device 810*c* and the honest device 815*c* as focal points of the hyperbola.

FIG. 8*d* is a block diagram describing the third step 820*a* in the use case described in FIG. 8*a* in accordance with one embodiment of the present invention. FIG. 8*d* includes a prover device 805*d*, a verifier device 810*d*, and an honest device 815*d*. The verifier device 810*d*, the honest device 815*d*, and the prover device 805*d* are capable of wireless communication and are compatible with Universal plug and play networking (UPnP). The prover device 805*d* sends a nonce message to the verifier device 810*d* and the honest device 815*d*. The nonce message includes a first timestamp indicating time of broadcast of the nonce message. The honest device 815*d* transmits a second timestamp indicating time of reception of the nonce message at the honest device 815*d* to the verifier device 810*d*. The verifier device 810*d* verifies location the prover device 805*d* by hyperbolic verification scheme described in conjunction with FIG. 3. The presence of malicious device 840*a* does not provide any support to the prover device 805*d* thus enabling the verifier device 810*d* and honest device 815*d* to verify the location claim of the prover device 805*d* successfully.

Figure 9A:
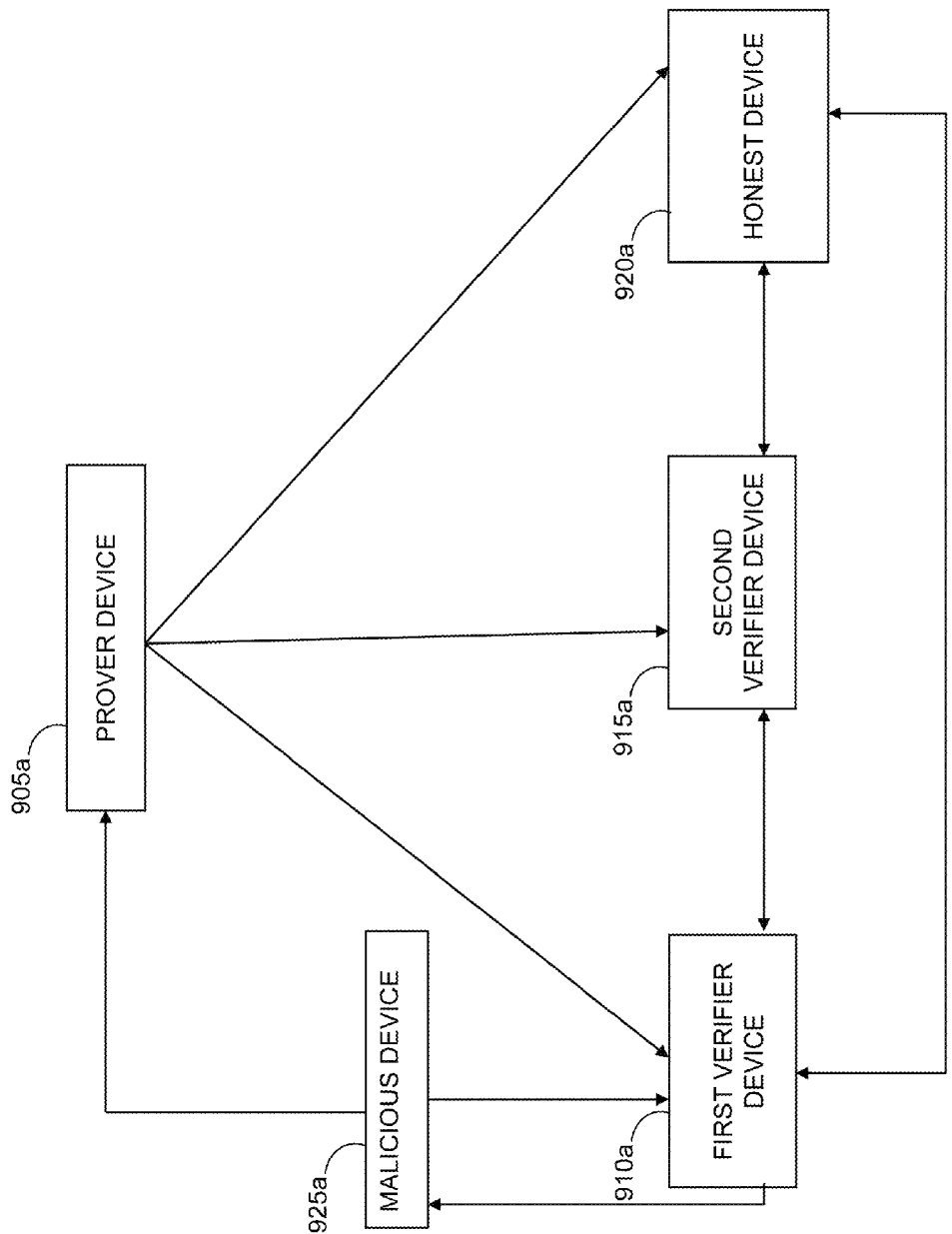
FIG. 9a is an exemplary illustration of location based verification of a prover device, in accordance with another embodiment of the present invention.

FIG. 9*a* is yet another exemplary illustration of a use case of location based verification with a prover device 905*a* a first verifier device 910*a*, an second verifier device 915*a*, and an honest device 920*a* in accordance with one embodiment of the present invention. FIG. 9*a* includes the prover device 905*a*, the first verifier device 910*a*, the second verifier device 915*a*, the honest device 920*a* and a malicious device 925*a*. Malicious devices are unauthorized network devices in a network.

Messages broadcasted via the network are susceptible to security attacks by the malicious devices in the network. Examples of security attacks by the malicious devices include but are not limited to passive interception of data messages, active injection of network traffic, overloading of the UPnP wireless network with garbage messages, and unauthorized modification of messages. The malicious devices compromise security of a network. Honest devices are network devices authenticated by a location based authentication system. The honest devices are functionally identical to verifier devices. The honest device 920*a* is replaceable with a third verifier device. The first verifier device 910*a*, the second verifier device 915*a*, the honest device 920*a*, and the prover device 905*a* are capable of wireless communication and are compatible with Universal plug and play networking (UPnP). Moreover, the prover device 905*a* has location information of the first verifier device 910*a*, and the second verifier device 915*a*. The first verifier device 910*a*, the second verifier device 915*a* and the honest device 920*a* performs location based authentication of the prover device 905*a*. The location based authentication of the prover device 905*a* includes verification of the location of the prover device 905*a*. The verification of location of the prover device 905*a* is interactive. The prover device 905*a* broadcasts a message at a first step. The message includes a first timestamp indicating the time of broadcast of the message (Ts). The first verifier device 910*a*, the second verifier device 915*a* and the honest device 920*a* verifies the location of the prover device 905*a* by hyperbolic verification scheme described in conjunction with FIG. 4. In a second step, a verifier device among the first verifier device 910*a* and the second verifier device 915*a* sends a nonce message to the prover device 905*a* randomly. The malicious device 925*a* lacks location information of the honest device 920*a*. As a result, the malicious device 925*a* is prevented from manipulating the first verifier device 910*a*, and the second verifier device 915*a* into providing access to the network.

FIG. 9*b* is a block diagram describing the first step in FIG. 9*a* in accordance with one embodiment of the present invention. FIG. 9*b* includes a prover device 905*b*, a first verifier device 910*b*, a second verifier device 915*b* and an honest device 920*b*. The first verifier device 910*b*, the second verifier device 915*b*, the honest device 920*b*, and the prover device 905*b* are capable of wireless communication and are compatible with Universal plug and play networking (UPnP). The prover device 905*b* broadcasts a message to the first verifier device 910*b*, the second verifier device 915*b* and the honest device 920*b*. The message includes a timestamp indicating the time of broadcast of the message (Ts).

Figure 9C:
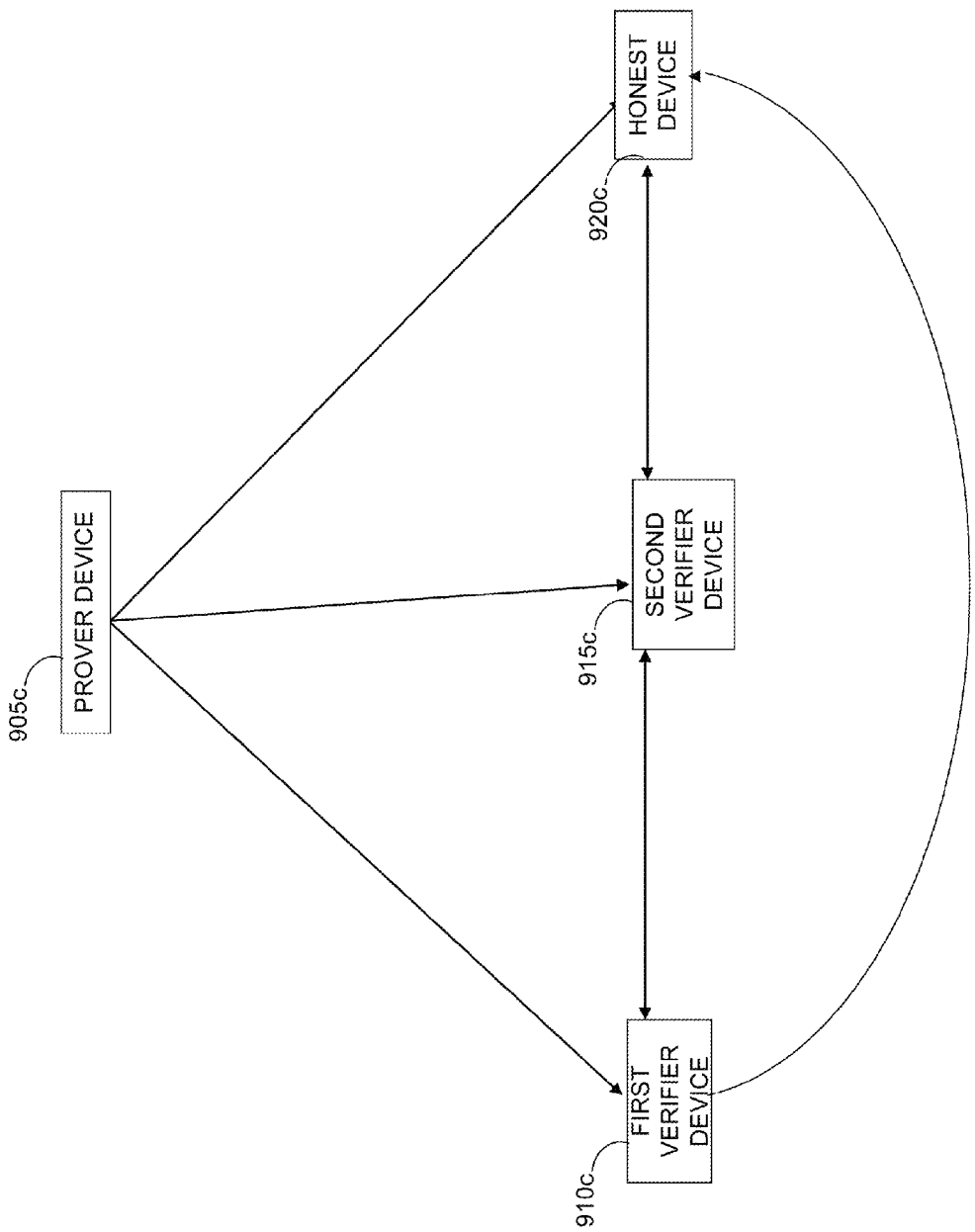
FIG. 9c illustrates a sub-step described in FIG. 9a, in accordance with one embodiment of the present invention.

FIG. 9*c* is a block diagram describing hyperbolic location verification in the use case described in FIG. 9*a* in accordance with one embodiment of the present invention. FIG. 9*c* includes a prover device 905*c*, a first verifier device 910*c*, a second verifier device 915*c* and an honest device 920*c*. The first verifier device 910*c*, the second verifier device 915*c*, the honest device 920*c*, and the prover device 905*c* are capable of wireless communication and are compatible with Universal plug and play networking (UPnP). The prover device 905*c* broadcasts a message to the first verifier device 910*c*, the second verifier device 915*c* and the honest device 920*c* with a timestamp.

The timestamp contains time of broadcast of the message from the prover device 905*c*. The time difference between time at a first instance when the message reaches the first verifier device 910*c* and the time of broadcast of the message from the prover device 905*c* is proportional to the distance between the prover device 905*c* and the second verifier device 915*c*. A first distance between the prover device 905*c* and the first verifier device 910*c* is calculated from the time difference between time at the instance when the message reaches the first verifier device 910*c* and the time of broadcast of the message from the prover device 905*c*. A second distance between the prover device 905*c* and the second verifier device 915*c* is calculated from the time difference between time at the instance when the message reaches the second verifier device 915*c* and the time of broadcast of the message from the prover device 905*c*. A third distance between the prover device 905*c* and the honest device 920*c* is calculated from the time difference between time at the instance when the message reaches the honest device 915*c* and the time of broadcast of the message from the prover device 905*c*. The first verifier device 910*c*, the second verifier device 915*c*, and the honest device 920*c* calculates the location of the prover device 905*c* from the first distance, the second distance and the third distance. The location based verification framework verifies if the location of prover device 905*c* is on the intersection of a first hyperbola, a second hyperbola and a third hyperbola. The first hyperbola has the first verifier device 910*c* and the second verifier device 915*c* as focal points. The second hyperbola has the second verifier device 915c and the third honest device 920c as focal points. The third hyperbola has the first verifier device 910c and the honest device 920c as focal points. Thus, enabling verifier device 910d and honest device 915d succeed in verifying the prover device's 905d location claim.

Figure 10A:
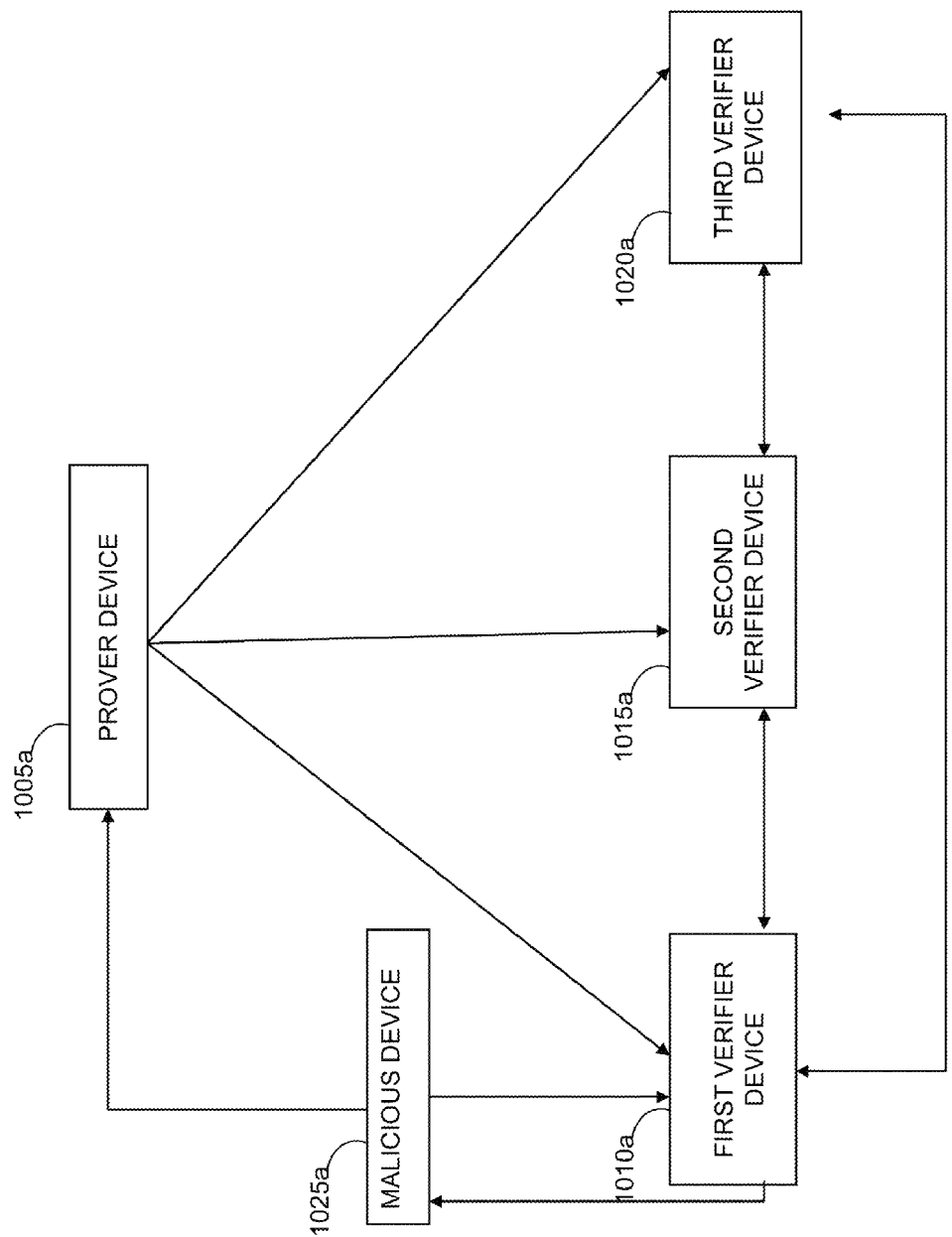
FIG. 10a is an exemplary illustration of location based verification of a prover device, in accordance with another embodiment of the present invention.

FIG. 10a is yet another exemplary illustration of a use case of location based verification a prover device 1005a, a first verifier device 1010a, a second verifier device 1015a, and a third verifier device 1020a in accordance with one embodiment of the present invention. FIG. 10a includes the prover device 1005a, the first verifier device 1010a, the second verifier device 1015a, the third verifier device 1020a and a malicious device 1025a. Malicious devices are unauthorized network devices in a network. Messages broadcasted via the network are susceptible to security attacks by the malicious devices in the network. Examples of security attacks by the malicious devices include but are not limited to passive interception of data messages, active injection of network traffic, overloading of the UPnP wireless network with garbage messages, and unauthorized modification of messages. The malicious devices compromise security of a network.

The first verifier device 1010a, the second verifier device 1015a, the third verifier device 1020a, and the prover device 1005a are capable of wireless communication and are compatible with Universal plug and play networking (UPnP). The first verifier device 1010a, the second verifier device 1015a and the third verifier device 1020a performs location based authentication of the prover device 1005a. The location based authentication of the prover device 1005a includes verification of the location of the prover device 1005a. The verification of location of the prover device 1005a is interactive. The prover device 1005a broadcasts a message at a first step. The message includes a first timestamp indicating the time of broadcast of the message (Ts). The first verifier device 1010a, the second verifier device 1015a and the third verifier device 1020a verifies the location of the prover device 1005a by hyperbolic verification scheme described in conjunction with FIG. 4. In a second step, a verifier device among the first verifier device 1010a, the second verifier device 1015a and the third verifier device 1020a sends a nonce message to the prover device 1005a randomly. The malicious device 1025a lacks location information of the first verifier device 1010a, the second verifier device 1015a and the third verifier device 1020a. As a result, the malicious device 1025a is prevented from manipulating the first verifier device 1010a, and the second verifier device 1015a and the third verifier device 1020a into providing access to the network.

FIG. 10b is a block diagram describing the first step in FIG. 10a in accordance with one embodiment of the present invention. FIG. 10b includes a prover device 1005b, a first verifier device 1010b, and a second verifier device 1015b and a third verifier device 1020b. The first verifier device 1010b, the second verifier device 1015b, the third verifier device 1020b, and the prover device 1005b are capable of wireless communication and are compatible with Universal plug and play networking (UPnP). The prover device 1005b broadcasts a message to the first verifier device 1010b, the second verifier device 1015b and the third verifier device 1020b. The message includes a timestamp indicating the time of broadcast of the message (Ts).

Figure 10C:
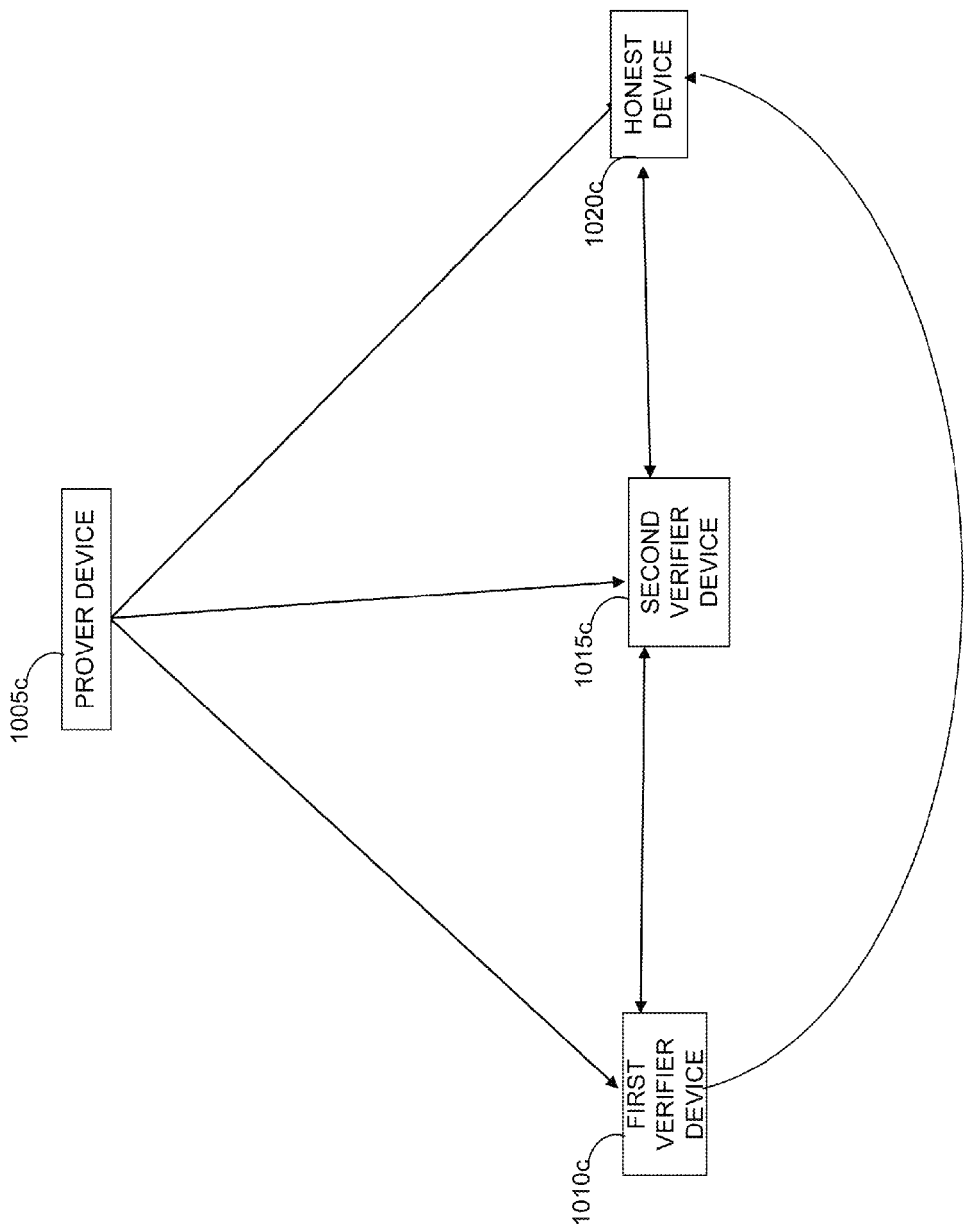
FIG. 10c illustrates a sub-step described in FIG. 10a, in accordance with one embodiment of the present invention.

FIG. 10c is a block diagram describing hyperbolic location verification in the use case described in FIG. 10a in accordance with one embodiment of the present invention. FIG. 10c includes a prover device 1005c, a first verifier device 1010c, a second verifier device 1015c and a third verifier device 1020c. The first verifier device 1010c, the second verifier device 1015c, the third verifier device 1020c, and the prover device 1005c are capable of wireless communication and are compatible with Universal plug and play networking (UPnP). The prover device 1005c broadcasts a message to the first verifier device 1010c, the second verifier device 1015c and the third verifier device 1020c with a timestamp.

The timestamp contains time of broadcast of the message from the prover device 1005c. The time difference between time at a first instance when the message reaches the first verifier device 1010c and the time of broadcast of the message from the prover device 1005c is proportional to the distance between the prover device 1005c and the second verifier device 1015c. A first distance between the prover device 1005c and the first verifier device 1010c is calculated from the time difference between time at the instance when the message reaches the first verifier device 1010c and the time of broadcast of the message from the prover device 1005c. A second distance between the prover device 1005c and the second verifier device 1015c is calculated from the time difference between time at the instance when the message reaches the second verifier device 1015c and the time of broadcast of the message from the prover device 1005c. A third distance between the prover device 1005c and the honest device 1020c is calculated from the time difference between time at the instance when the message reaches the third verifier device 1015c and the time of broadcast of the message from the prover device 1005c. The first verifier device 1010c, the second verifier device 1015c, and the third verifier device 1020c calculates the location of the prover device 1005c from the first distance, the second distance and the third distance.

The location based verification framework verifies if the location of prover device 1005c is on the intersection of a first hyperbola, a second hyperbola and a third hyperbola. The first hyperbola has the first verifier device 1010c and the second verifier device 1015c as focal points. The second hyperbola has the second verifier device 1015c and the third honest device 1020c as focal points. The third hyperbola has the first verifier device 1010c and the honest device 1020c as focal points. Thus, enabling first verifier device 1010c, second verifier device 1015c and third verifier device 1020c succeed in verifying the prover device's 1005c location claim.

Advantageously, the embodiments specified in the present disclosure provide a location based verification framework for devices connected in a network compatible with Universal Plug and Play (UPnP). The present invention verifies locations of the devices in the network to authenticate the devices. The present invention protects a plurality of devices in the network from collusion attacks from malicious devices in the network. Alternately, the present invention provides a method for verifying location of a wireless device connected to a server in a cloud computing system. The present invention discloses a method for generating a location based data encryption key for a wireless device in the network to enhance data security.

The present invention can also be implemented for Universal Plug and Play (UPnP) devices in a Home network scenario where the location of the UPnP devices is used for generating the own public keys for each UPnP devices. The UPnP devices observe the Home network in their vicinity and send the location position to a server system. Since the location and data of UPnP devices are linked to each other, UPnP device's are used to generate unique public key.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below.

Accordingly, the specification and figures are to be regarded as illustrative examples of the present disclosure, rather than in restrictive sense. All such possible modifications are intended to be included within the scope of present disclosure.

What is claimed is:

1. A method of authenticating a network device, the method comprising:
   receiving a first signal including a timestamp indicating time of broadcast of the first signal of a first network device from the first network device;
   calculating a first distance between the first network device and a second network device using the timestamp;
   receiving, from a third network device, a second distance between the first network device and the third network device calculated using the timestamp;
   calculating a location of the first network device based on the calculated first distance and the received second distance;
   verifying location of the first network device based on the calculated location of the first network device; and
   authenticating the first network device based on the verification,
   wherein the verifying further comprises:
      transmitting a second signal including a first nonce message to the first network device, and
      in response to the second signal, receiving a third signal including a second nonce message from the first network device.

2. The method as claimed in claim 1, wherein the first network device communicates with the second network device and the third network device via at least one of Wifi networks, Wimax networks, Near field communication networks (NFC), sound based communication networks, multimedia based communication networks and Bluetooth networks.

3. The method as claimed in claim 1 and further comprising:
   sending location information of the first network device as public key to one or more network devices subsequent to authentication.

4. The method as claimed in claim 1, wherein the second network device and the third network device communicate via a secure communication channel.

5. The method as claimed in claim 1, wherein time taken for the first signal to propagate from the first network device to the second network device is time difference between a first instance when the second network device receives the first signal and time indicated by the timestamp.

6. The method as claimed in claim 1, wherein time taken for the first signal to propagate from the first network device to the third network device is time difference between a second instance when the third network device receives the first signal and time indicated by the timestamp.

7. The method as claimed in claim 1, wherein the location based verification is used for Universal Plug and Play devices in a Home Network scenario.

8. The method as claimed in claim 1, wherein the authenticating the first network device further comprises generating a location based data encryption key for the first network device in response to the authentication.

9. The method as claimed in claim 1, wherein the verifying the location of the first network device comprises further verifying the location of the first network device to be within a set of calculated locations of the first network device by a hyperbolic verification scheme.

10. The method as claimed in claim 1, wherein distances of the first network device from the second network device and the third network device are proportional to time taken by the first signal to propagate from the first network device to the second network device and to the third network device respectively.

11. A system of authenticating a network device, the system comprising:
   a plurality of network devices; and
   a verifying module to verify location information of a network device; and
   an authenticating module to authenticate the network device based on verification, wherein the network device transmits identification information of the network device to at least two other network devices among the plurality of network devices via a communication channel, wherein the identification information comprises location information of the network device and a timestamp,
      wherein the verifying module is configured to verify a location of the network device based on calculated locations of the network device by the at least two other network devices,
      wherein a first other network device calculates a first distance between the network device and the first other network device using timestamps,
      wherein a second other network device calculates a second distance between the network device and the second other network device using the timestamps,
      wherein the first other network device and the second other network device calculate the location of the network device from the first distance and the second distance,
      wherein one of the first other network device and the second other network device transmits a first signal including a first nonce message to the network device, and
      wherein, in response to the first signal, the network device transmits a second signal including a second nonce message to the first other network device and the second other network device.

12. The system as claimed in claim 11, wherein the communication channel is configured to enable communication between the plurality of network devices.

13. The system as claimed in claim 11 wherein the communication channel is at least one of Wifi networks, Wimax networks, Near field communication networks (NFC), sound based communication networks, multimedia based communication networks and Bluetooth networks.

14. The system as claimed in claim 11, wherein the verifying module is configured to verify the location of the network device whether the location of the network device is within a set of calculated locations of the first other network device by a hyperbolic verification scheme.

* * * * *